US010505744B2

(12) United States Patent
Ghosh et al.

(10) Patent No.: US 10,505,744 B2
(45) Date of Patent: Dec. 10, 2019

(54) TECHNOLOGIES FOR ROBUST COMPUTATION OF ELLIPTIC CURVE DIGITAL SIGNATURES

(71) Applicant: Intel Corporation, Santa Clara, CA (US)

(72) Inventors: Santosh Ghosh, Hillsboro, OR (US); Manoj R. Sastry, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 204 days.

(21) Appl. No.: 15/637,737

(22) Filed: Jun. 29, 2017

(65) Prior Publication Data

US 2019/0007219 A1    Jan. 3, 2019

(51) Int. Cl.
*H04L 29/06* (2006.01)
*H04L 9/32* (2006.01)
*H04L 9/30* (2006.01)
*G09C 1/00* (2006.01)

(52) U.S. Cl.
CPC ............ *H04L 9/3252* (2013.01); *G09C 1/00* (2013.01); *H04L 9/3066* (2013.01); *H04L 2209/12* (2013.01); *H04L 2209/127* (2013.01)

(58) Field of Classification Search
CPC ........ H04L 9/3247; H04L 9/3066; H04L 9/00
See application file for complete search history.

(56) References Cited

U.S. PATENT DOCUMENTS

2015/0178503 A1* 6/2015 Knezevic ............... G06F 7/725
                                                            380/28
2015/0288520 A1* 10/2015 Jacobson ............. H04L 9/3066
                                                            380/28

OTHER PUBLICATIONS

U.S. Appl. No. 15/428,773, filed Feb. 9, 2017, entitled "Technologies for Elliptic Curve Cryptography Hardware Acceleration" by Santosh Ghosh and Manoj Sastry.
(Continued)

*Primary Examiner* — Izunna Okeke
(74) *Attorney, Agent, or Firm* — Barnes & Thornburg LLP

(57) ABSTRACT

Technologies for elliptic curve cryptography (ECC) include a computing device having an ECC engine that reads one or more parameters from a data port. The ECC engine performs operations using the parameters, such as an Elliptic Curve Digital Signature Algorithm (ECDSA). The ECDSA may be performed in a protected mode, in which the ECC engine will ignore inputs. The ECC engine may perform the ECDSA in a fixed amount of time in order to protect against timing side-channel attacks. The ECC engine may perform the ECDSA by consuming a uniform amount of power in order to protect against power side-channel attacks. The ECC engine may perform the ECDSA by emitting a uniform amount of electromagnetic radiation in order to protect against EM side-channel attacks. The ECC engine may perform the ECDSA verify with 384-bit output in order to protect against fault injection attacks.

25 Claims, 8 Drawing Sheets

(56) References Cited

OTHER PUBLICATIONS

IEEE Std 1609.2-2016 ("IEEE Standard for Wireless Access in Vehicular Environments—Security Services for Applications and Management Messages"), approved Jan. 29, 2016.
"Elliptic Curve Digital Signature Algorithm," retrieved from https://en.wikipedia.org/wiki/Elliptic_Curve_Digital_Signature_Algorithm on Jun. 29, 2017.
"Elliptic curve point multiplication," retrieved from https://en.wikipedia.org/wiki/Elliptic_curve_point_multiplication on Jun. 29, 2017.
FIPS PUB 140-2, "Security Requirements for Cryptographic Modules," dated May 25, 2001.

* cited by examiner

TECHNOLOGIES FOR ROBUST COMPUTATION OF ELLIPTIC CURVE DIGITAL SIGNATURES

BACKGROUND

As computing devices and electronic communication networks continue to proliferate in a variety of forms, information security remains an important concern. Cryptographic techniques are often used to ensure that electronic information is safely delivered to its intended recipient, and to determine whether devices and/or processes requesting access to information or other devices should be granted such access. Public key cryptography is a technique that typically uses two keys: a private key, which remains secret; and a public key, which may be freely disclosed, to define membership in a group of trusted computing devices. While the public key and the private key are related, the private key cannot feasibly be determined from the public key.

Elliptic curve cryptography (ECC) is a class of public key cryptography based on cryptographic operations using elliptic curves over finite fields. ECC operations may be used to perform traditional cryptographic operations including key exchange and digital signature operations. For example, common cryptographic algorithms using ECC operations include elliptic curve Diffie-Hellman (ECDH) for key exchange, the elliptic curve digital signature algorithm (ECDSA) for digital signature sign/verify operations, enhanced privacy ID (EPID) for attestation, and other cryptographic algorithms.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
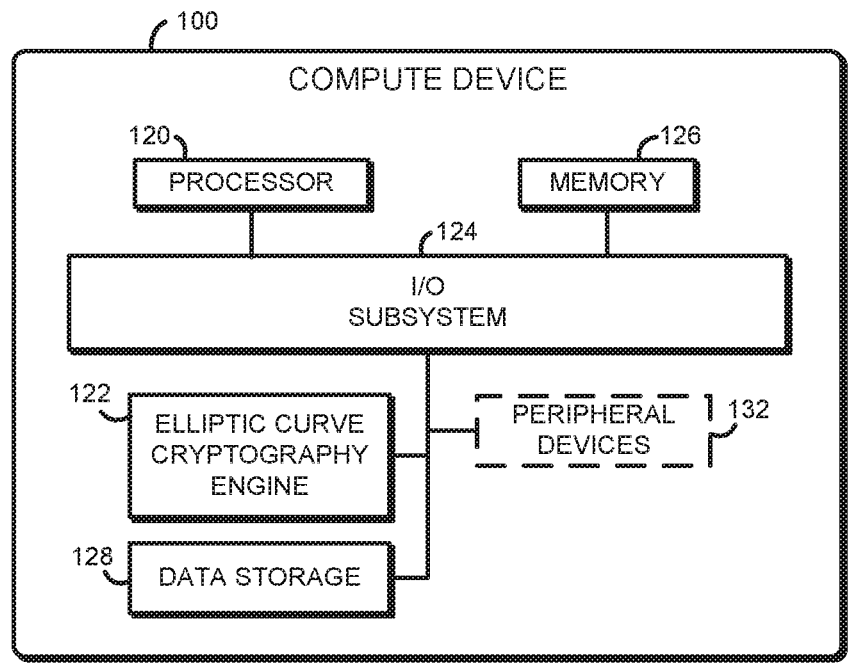
FIG. 1 is a simplified block diagram of at least one embodiment of a compute device for robust computation of elliptic curve digital signatures.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a compute device 100 for robust computation of elliptic curve digital signatures includes a processor 120 and an elliptic curve cryptography (ECC) engine 122. As described below, software and/or firmware executed by the processor 120 may offload elliptic curve cryptographic operations to the ECC engine 122. The processor 120 loads one or more registers of the ECC engine 122 with appropriate parameters and/or operands and instructs the ECC engine 122 to perform a cryptographic operation, such as signing a message using an elliptic curve digital signature algorithm (ECDSA). While the ECC engine 122 is signing the message, the ECC engine 122 may be in a protected mode, in which the ECC engine 122 will ignore inputs to the ECC engine 122 such as data in, instruction valid, ECC instruction, etc., until the signing of the message is complete. The processor 120 may then read results data from the ECC engine 122. The ECC engine 122 may provide fast, power-efficient computation of ECC cryptographic operations, with improved performance and/or power consumption compared to performing the same operation using a general-purpose processor core. For example, one potential embodiment of the ECC engine 122 has been developed to occupy about 22,500 square micrometers or about 101,000 logic gates. By providing low power consumption and a relatively high level of security strength, the ECC engine 122 may be appropriate for Internet-of-Things devices or other low-power devices with long deployment cycles (e.g., 15-20 years).

The compute device 100 may be embodied as any type of computation or computer device capable of performing the functions described herein, including, without limitation, a computer, a mobile computing device, an Internet-of-Things device, a network appliance, a web appliance, a wearable computing device, a laptop computer, a notebook computer, a tablet computer, a desktop computer, a workstation, a server, a distributed computing system, a processor-based system, and/or a consumer electronic device. As shown in FIG. 1, the compute device 100 illustratively include a processor 120, an input/output subsystem 124, a memory 126, a data storage device 128, and/or other components and devices commonly found in an Internet-of-Things device or similar computing device. Of course, the compute device 100 may include other or additional components, such as those commonly found in a mobile computing device (e.g., various input/output devices), in other embodiments. Additionally, in some embodiments, one or more of the illustrative components may be incorporated in, or otherwise form a portion of, another component. For example, the memory 126, or portions thereof, may be incorporated in the processor 120 in some embodiments.

The processor 120 may be embodied as any type of processor capable of performing the functions described herein. The processor 120 may be embodied as a single or multi-core processor(s), digital signal processor, microcontroller, or other processor or processing/controlling circuit. As shown, the processor 120 includes the ECC engine 122. The ECC engine 122 may be embodied as any functional block, IP core, embedded controller, logic circuit, logic gates, and/or other component of the processor 120 capable of performing the functions described herein. Additionally, although illustrated as being included in the processor 120, it should be understood that in some embodiments the ECC engine 122 may be included in a different component of the compute device 100 such as the I/O subsystem 124 or may be embodied as a standalone accelerator, coprocessor, security engine, field programmable gate array (FPGA), or other integrated circuit.

The memory 126 may be embodied as any type of volatile or non-volatile memory or data storage capable of performing the functions described herein. In operation, the memory 126 may store various data and software used during operation of the compute device 100, such as operating systems, applications, programs, libraries, and drivers. The memory 126 is communicatively coupled to the processor 120 via the I/O subsystem 124, which may be embodied as circuitry and/or components to facilitate input/output operations with the processor 120, the memory 126, and other components of the compute device 100. For example, the I/O subsystem 124 may be embodied as, or otherwise include, memory controller hubs, input/output control hubs, platform controller hubs, integrated control circuitry, firmware devices, communication links (i.e., point-to-point links, bus links, wires, cables, light guides, printed circuit board traces, etc.) and/or other components and subsystems to facilitate the input/output operations. In some embodiments, the I/O subsystem 124 may form a portion of a system-on-a-chip (SoC) and be incorporated, along with the processor 120, the memory 126, and other components of the compute device 100, on a single integrated circuit chip.

The data storage device 128 may be embodied as any type of device or devices configured for short-term or long-term storage of data such as, for example, memory devices and circuits, memory cards, hard disk drives, solid-state drives, or other data storage devices.

As shown, the compute device 100 may also include one or more peripheral devices 132. The peripheral devices 132 may include any number of additional input/output devices, interface devices, and/or other peripheral devices. For example, in some embodiments, the peripheral devices 132 may include a display, touch screen, graphics circuitry, keyboard, mouse, speaker system, microphone, network interface, and/or other input/output devices, interface devices, and/or peripheral devices.

Figure 2:
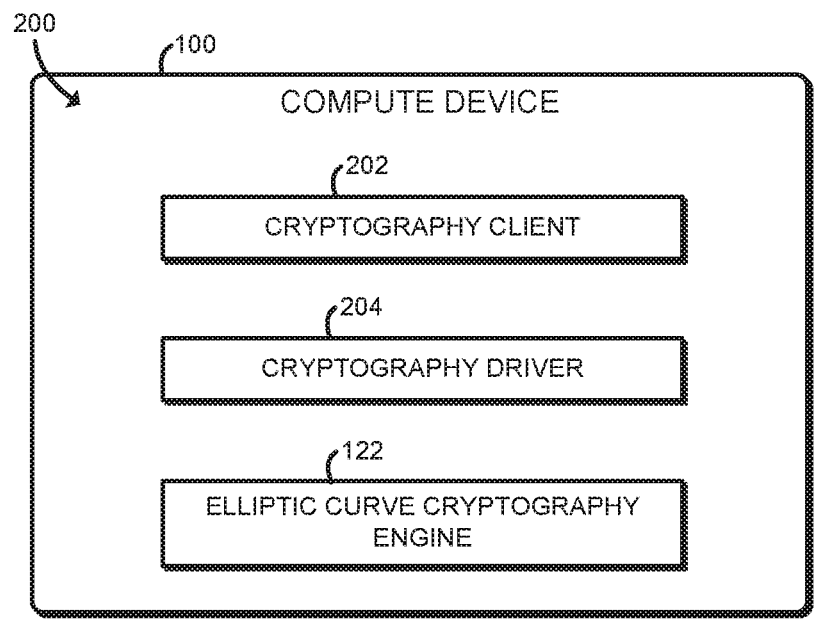
FIG. 2 is a simplified block diagram of at least one embodiment of an environment that may be established by a compute device of FIG. 1.

Referring now to FIG. 2, in an illustrative embodiment, the compute device 100 establishes an environment 200 during operation. The illustrative environment 200 includes a cryptography client 202, a cryptography driver 204, and the ECC engine 122. The various components of the environment 200 may be embodied as hardware, firmware, software, or a combination thereof. As such, in some embodiments, one or more of the components of the environment 200 may be embodied as circuitry or collection of electrical devices (e.g., cryptography client circuitry 202, cryptography driver circuitry 204, and/or ECC engine circuitry 122). It should be appreciated that, in such embodiments, one or more of the cryptography client circuitry 202, the cryptography driver circuitry 204, and/or the ECC engine circuitry 122 may form a portion of one or more of the processor 120, the I/O subsystem 124, and/or other components of the compute device 100. Additionally, in some embodiments, one or more of the illustrative components may form a portion of another component and/or one or more of the illustrative components may be independent of one another.

The cryptography client 202 may be embodied as any operating system, library, application, or other computer program executed by the compute device 100 that performs cryptographic procedures using elliptic curve cryptography (ECC). For example, the cryptography client 202 may be embodied as a library or application that performs a cryptographic protocol that includes ECC operations, such as ECDSA, ECDH, EPID, or other protocol. To perform the cryptographic procedures, the cryptography client 202 invokes the cryptography driver 204 to perform one or more cryptographic operations, such elliptic curve scalar multiplication, elliptic curve point addition, elliptic curve point doubling, prime field exponentiation, prime field multiplication, prime field addition, and/or prime field subtraction. In the illustrative embodiment, the cryptography client 202 may invoke the cryptography driver 204 to perform an algorithm involving a cryptographic operation involving several steps and intermediate cryptographic calculations, such as an elliptic curve digital signature algorithm (ECDSA) signing operation or an ECDSA verify operation. As described further below, the cryptography driver 204 is configured to program the ECC engine 122 to perform the requested cryptographic operations.

The ECC engine 122 is configured to read a datapath selector signal of the ECC engine 122. The datapath selector signal indicates a 256-bit data width or a 384-bit data width. The ECC engine 122 is further configured to read one or more parameter values corresponding to parameters of the requested cryptographic operation from a data port of the ECC engine 122. Each parameter has a data width indicated by the datapath selector signal. The ECC engine 122 is further configured to read an opcode indicative of the requested cryptographic operation from an instruction port of the ECC engine 122 and to perform the requested cryptographic operation. The cryptographic operation also has a data width indicated by the datapath selector signal. In some embodiments, the opcode may be indicative of a register of the ECC engine 122, and the ECC engine 122 may store the parameter value in the identified register. After receiving an instruction to perform certain operations, such as an ECDSA sign operation, the ECC engine 122 may enter a protected mode, in which the ECC engine will ignore some or all of the inputs provided to the ECC engine 122, such as data in, data in valid, reset, ECC start, instruction valid, ECC instruction, etc. The ECC engine 122 may remain in the protected mode until the operation is complete, and then the ECC engine 122 may exit the protected mode. The ECC engine 122 is further configured to write results data to an output port of the ECC engine 122 in response to performing the cryptographic operation. The results data also has a data width indicated by the datapath selector signal.

The cryptography driver 204 is configured to determine whether a busy signal of the ECC engine 122 is set and then set the datapath selector signal of the ECC engine 122 in response to determining that the busy signal is not set. The cryptography driver 204 is further configured to assert a start signal of the ECC engine 122 in response to setting the datapath selector signal. The cryptography driver 204 is further configured to write the opcode to the instruction port of the ECC engine 122 in response to asserting the start signal and to assert an instruction valid signal of the ECC engine 122 in response to writing the opcode.

The ECC engine 122 is further configured determine whether the start signal is asserted and set the busy signal in response to determining that the start signal is asserted. The ECC engine 122 is further configured to determine whether the instruction valid signal is asserted in response to determining that the start signal is asserted and to read the opcode in response to determining that the instruction valid signal is asserted. The ECC engine 122 is further configured to clear the busy signal in response to performing the cryptographic operation and to assert an operation done signal of the ECC engine 122 in response to clearing the busy signal. The cryptography driver 204 is further configured to determine whether the operation done signal of the ECC engine 122 is asserted and to read results data from the output port of the ECC engine 122 in response to determining that the operation done signal of the ECC engine 122 is asserted.

Figure 3:
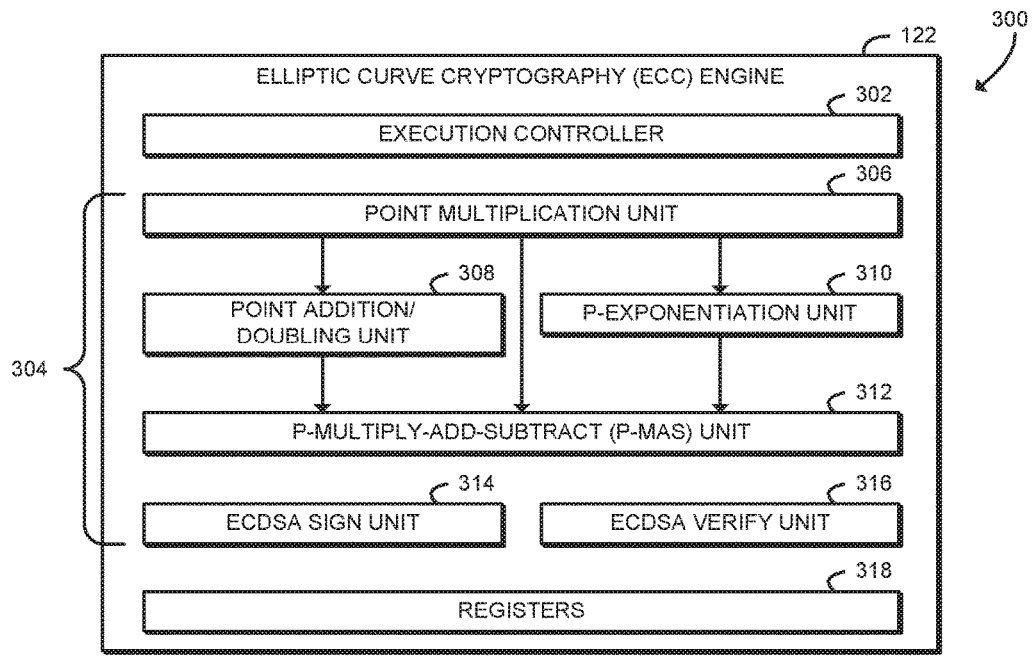
FIG. 3 is a simplified block diagram of at least one embodiment of an elliptic curve cryptography (ECC) engine of FIGS. 1-2.

Referring now to FIG. 3, diagram 300 illustrates one potential embodiment of various components of the ECC engine 122. As shown, the ECC engine 122 may include an execution controller 302, multiple execution resources 304, and registers 318. The execution resources 304 illustratively include a point multiplication unit 306, a point addition/doubling unit 308, a p-exponentiation unit 310, a p-multiply-add-subtract (p-MAS) unit 312, an elliptic curve digital signature algorithm (ECDSA) sign unit 314, and an ECDSA verify unit 316. Each of the execution resources 304 may load data from and store data to the registers 318. Additionally, data may be transferred directly between certain execution resources 304. For example, the point multiplication unit 306 may provide data to the point addition/doubling unit 308, the p-exponentiation unit 310, and the p-MAS unit 312, the point addition/doubling unit 308 may provide data to the p-MAS unit 312, and the p-exponentiation unit 310 may provide data to the p-MAS unit 312. Each of the ECDSA sign unit 314 and the ECDSA verify unit 316 may, in some embodiments, send data to and receive data from one or more of the point multiplication unit 306, the point addition/doubling unit 308, the p-exponentiation unit 310, and the p-multiply-add-subtract (p-MAS) unit 312.

The execution controller 302 is configured to decode instructions provided to the ECC engine 122 and generate corresponding internal control signals. As described further below, the execution controller 302 may also convert input data from affine coordinates (e.g., x and y coordinates) to Jacobian projective coordinates for certain operations. The execution controller 302 activates corresponding execution resources 304 to execute the current instruction. After execution, the execution controller 302 may convert the Jacobian projective coordinates back to affine coordinates. The execution controller 302 is configured to output results data on one or more data out ports and to signal to the cryptography driver 204 that results are ready.

The point multiplication unit 306 is configured to compute the scalar multiplication operation [d]P, where d is a scalar value and P is a point on the elliptic curve. In some embodiments, the point multiplication unit 306 may perform the scalar multiplication operation using a binary left-2-right double-and-add procedure. Additionally or alternatively, in some embodiments, the point multiplication unit 306 may perform the scalar multiplication using a Montgomery Ladder procedure.

The point addition/doubling unit 308 is configured to execute the point addition operation A+B and the point doubling operation 2A, where A and B are both points on the elliptic curve. In some embodiments, the point addition/doubling unit 308 may perform the A+B and 2A operations based on affine coordinates. Additionally or alternatively, in some embodiments, the point addition/doubling unit 308 may perform the A+B and 2A operations based on standard Jacobian projective coordinate point addition formula. In some embodiments, the point addition/doubling unit 308 may provide speedups for the 2A operation for certain elliptic curves by performing different operations based on the value of a curve parameter a. For example, if a is zero, then the point addition/doubling unit 308 may perform the 2A operation with six prime field multiplication operations, if a is three then the point addition/doubling unit 308 may perform the 2A operation with eight prime field multiplication operations, and if a is not zero and not three, the point addition/doubling unit 308 may perform the 2A operation with 10 prime field multiplication operations.

The p-exponentiation unit 310 is configured to compute prime field exponentiation $a^b$ (mod p) with timing and simple power/electromagnetic radiation protection. Similarly, the p-MAS unit 312 is configured to compute prime field multiplication a·b (mod p), prime field addition a+b (mod p), and prime field subtraction a−b (mod p) with timing and simple power/electromagnetic radiation protection.

The ECDSA sign unit 314 is configured to perform an ECDSA sign operation. In an ECDSA sign operation, a private key is used to generate signature values based on a message, and a third party can then verify that the private key was used to generate the signature values. In order to perform an ECDSA sign operation, the appropriate input parameters are loaded into the registers 318. For example, in the illustrative embodiment, the inputs include e (the lower 256 or 348 bits of a hash of the message to be signed), $G_x$ (the x-coordinate of the base point G), $G_y$ (the y-coordinate of the base point G), n (the order of G), p (the prime defining the finite field), a (a constant used in the definition of the elliptic curve), d (the private key), k (a random number used in the signing algorithm), and λ (a second random number used in the signing algorithm). The hash of the message used for e may be any suitable hash or cryptographic hash, such as SHA-2. After receiving a signal to begin the ECDSA algorithm, the ECC engine 122 may enter a protected mode, in which the ECC engine 122 will ignore some or all of the inputs provided to the ECC engine 122, such as data in, data in valid, reset, ECC start, instruction valid, ECC instruction, etc. As described in more detail in FIGS. 7-8 below, the ECDSA sign unit 314 may employ operations such as point multiplication, point addition/doubling, p-exponentiation, p-multiply-add-subtract as part of the implementing the ECDSA algorithm. When the ECC engine 122 has completed the ECDSA sign algorithm, the ECC engine 122 exits the protected mode and provides the signature as an output of the ECC engine 122.

In some embodiments, the ECDSA sign unit 314 may employ certain protections to guard against side-channel attacks. For example, the ECDSA sign unit 314 may transform the base point G into one, two, or more equivalent randomized Jacobian coordinates using the second random number λ. It should be appreciated that using the randomized Jacobian coordinates leads to a scrambling of the bits while the calculations are being done on the Jacobian coordinates, which may prevent leaking of secret bits to an eavesdropper through, e.g., electromagnetic radiation. Additionally or alternatively, point multiplication used as part of the ECDSA sign operation may use a Montgomery ladder, which, as discussed below in more detail in regard to FIGS. 7-8, may perform the point multiplication in a fixed time independent of the value of private key d.

The ECDSA verify unit 316 is configured to perform an ECDSA verify operation. In an ECDSA verify operation, the signature values corresponding to a certain message are verified to have been generated using the private key corresponding to a known public key. In order to perform an ECDSA verify operation, the appropriate input parameters are loaded into the registers 318. For example, in the illustrative embodiment, the inputs include e (the lower 256 or 348 bits of a hash of the message to be signed), $G_x$ (the x-coordinate of the base point G), $G_y$ (the y-coordinate of the base point G), $Q_x$ (the x-coordinate of the public key Q), $Q_y$ (the y-coordinate of the public key Q), n (the order of G), p (the prime defining the finite field), a (a constant used in the definition of the elliptic curve), r (a first signature value), and s (a second signature value). As described in more detail in FIGS. 9-10 below, the ECDSA verify unit 316 may employ operations such as point multiplication, point addition/doubling, p-exponentiation, p-multiply-add-subtract as part of the implementing the ECDSA algorithm. When the ECC engine 122 has completed the ECDSA verify algorithm, the ECC engine 122 provides an output indicating whether the signature was verified or not. In the illustrative embodiment, the ECC engine 122 may provide multiple bits indicating whether the signature was verified or not. For example, when the signature is verified, each bit in an output register may be one, and when the signature is not verified, each bit in the same output register may be zero. Using multiple redundant bits as an output may help protect against certain attacks that could flip a single bit, such as fault injection attacks. It should be appreciated that the signature calculation is generally not secret, so the ECDSA verify unit 316 may not employ side-channel protection techniques.

In some embodiments, the ECDSA verify unit 316 may perform certain steps of the ECDSA verify algorithm in a manner which speeds up the calculations. In particular, as discussed below in more detail in regard to FIGS. 9-10, the ECDSA verify operation requires calculation of the point addition of two point multiplication operations, e.g., of the form $[u_1]G+[u_2]Q$. The ECDSA verify unit 316 may calculate the sum of the two point multiplication operations with a single loop through the bits of the scalar multipliers $u_1$ and $u_2$, as opposed to calculating each result of the two point multiplication operations separately and then adding the results together. Such an approach may significantly speed up the calculation, such as a reduction in execution time by a factor of approximately 1.5.

Figure 4:
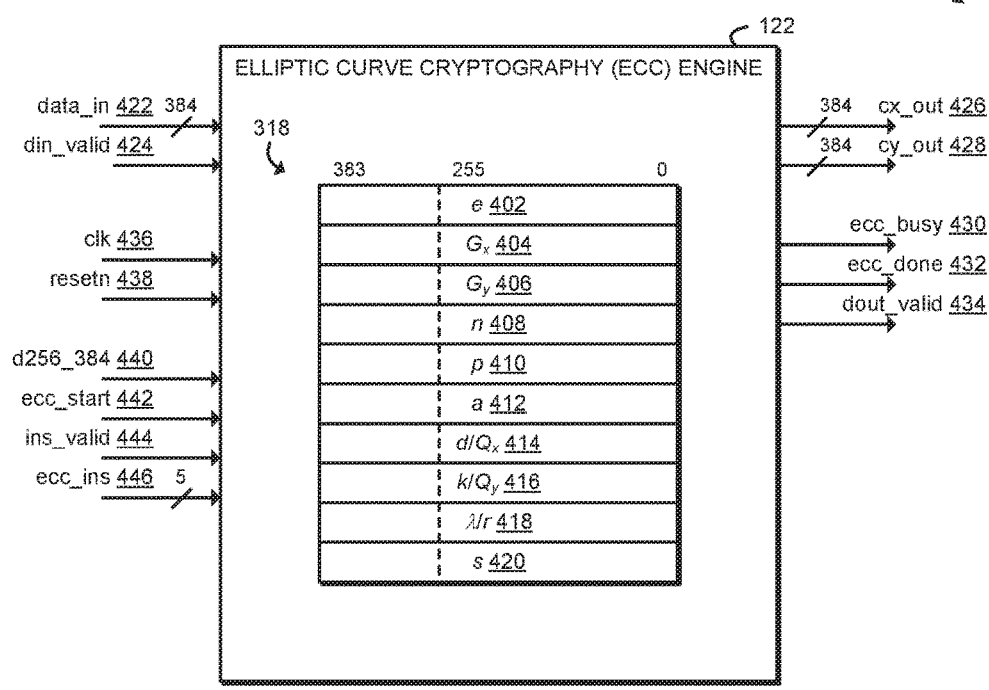
FIG. 4 is a simplified pinout diagram of at least one embodiment of the ECC engine of FIGS. 1-3.

Referring now to FIG. 4, diagram 400 illustrates one potential embodiment of the registers 318 and various input/output signals, lines, pins, buses, or other interface connections provided by the ECC engine 122. As described further below, software and/or firmware executed by the processor 120 may control the ECC engine 122 by reading and writing data and/or control signals of the ECC engine 122.

As shown, the illustrative ECC engine 122 includes ten registers 318. Each of the registers 318 is 384 bits wide. As described further below, the ECC engine 122 may be programmed to use all 384 bits of each register 318 for 384-bit operations or may be programmed to use the least significant 256 bits of each register 318 for 256-bit operations. Each of the registers 318 may store parameter data provided by the processor 120 as well as intermediate data and results data generated by the ECC engine 122. As shown in FIG. 4, the registers 318 include an e register 402, a $G_x$ register 404, a $G_y$ register 406, an n register 408, a p register 410, an a register 412, a $d/Q_x$ register 414, a $k/Q_y$ register 416, a Air register 418, and an s register 420. The semantics of each register 318 may depend on the particular cryptographic operation executed by the ECC engine 122 and are further described below. In some embodiments, some of the registers may have a different width. For example, the a register 412 may not require 384 bits and may be embodied as a smaller register, such as an 8-bit register. Of course, in addition to the top-level registers 318 shown in FIG. 4, in some embodiments the ECC engine 122 may include additional registers that are not shown.

The ECC engine 122 includes a data in port 422 and a data in valid signal 424. The data in port may include 384 separate signals, lines, bits, pins, or other interface connections. As described further below, the processor 120 may write parameter data to the data in port 422 that is to be stored in one of the registers 318. The processor 120 may set the data in valid signal 424 to indicate that valid data is on the data in port 422.

The ECC engine 122 includes a data out port 426 and a data out port 428. Each of the data out ports 426, 428 may include 384 separate signals, lines, bits, pins, or other interface connections. As described further below, the ECC engine 122 may write output data from an ECC operation onto one or more of the data out ports 426, 428. For example, the ECC engine 122 may write the x, y coordinates of a point C to the data out ports 426, 428, respectively. The ECC engine 122 further includes a data out valid signal 434. The ECC engine 122 may set the data out valid signal 434 to indicate that valid data is on the data out ports 426, 428.

The ECC engine 122 includes an ECC busy signal 430 and an ECC done signal 432. The ECC engine 122 may set the ECC busy signal 430 to indicate that it is currently processing a cryptographic operation and the processor 120 should not start a new cryptographic operation. The ECC engine 122 may assert a pulse on the ECC done signal 432 to indicate that the cryptographic operation is completed. As described further below, the processor 120 may read results data from the data out ports 426, 428 after the ECC done signal 432 is asserted. The ECC engine 122 further includes a clock signal 436 and an asynchronous reset signal 438.

As shown, the ECC engine 122 includes a datapath selector signal 440. As describe further below, the processor 120 may set the datapath selector signal 440 to program the ECC engine 122 to perform 384-bit cryptographic operations on 384-bit data or clear the datapath selector signal 440 to program the ECC engine 122 to perform 256-bit cryptographic operations on 256-bit data.

The ECC engine 122 further includes an ECC start signal 442, an instruction valid signal 444, and an instruction port 446. As described further below, the processor 120 may assert a pulse on the ECC start signal 442 to cause the ECC engine 122 to start processing a new cryptographic operation. As described above, the ECC engine 122 may set the ECC busy signal 430 after the ECC start signal 442 is asserted. The processor 120 may write an instruction opcode to the instruction port 446. As described further below, the instruction opcode may identify a register 318 to be loaded with data or a cryptographic operation to be performed. The processor 120 may also assert a pulse on the instruction valid signal 444 when a valid instruction opcode has been written to the instruction port 446. As described further below, in response to assertion of the instruction valid signal 444, the ECC engine 122 may read data into the specified register 318 or perform the specified cryptographic operation.

Figure 5:
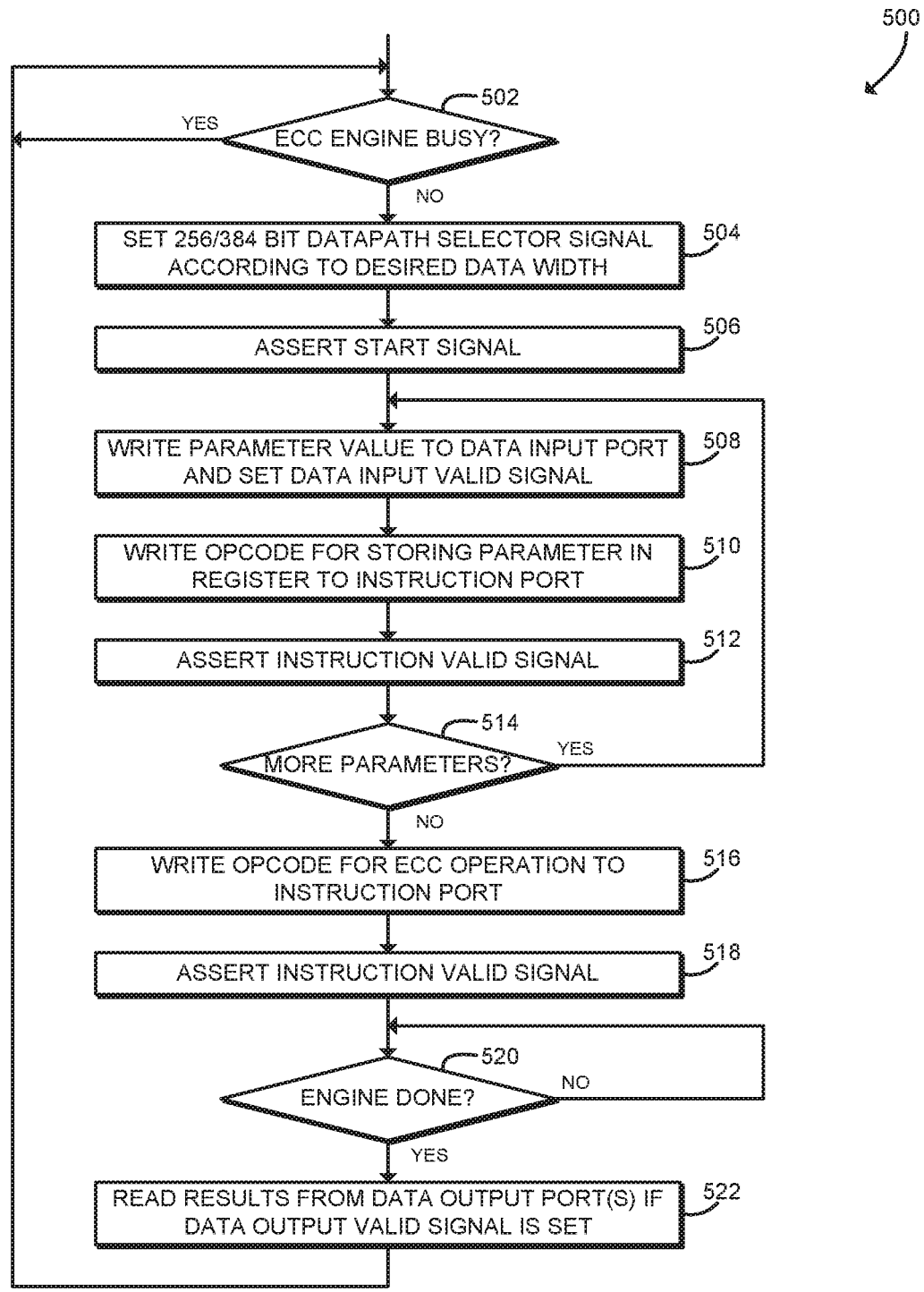
FIG. 5 is a simplified flow diagram of at least one embodiment of a method for driving an ECC engine that may be executed by the compute device of FIGS. 1-4.

Referring now to FIG. 5, in use, the compute device 100 may execute a method 500 for driving the ECC engine 122. It should be appreciated that, in some embodiments, the operations of the method 500 may be performed by one or more components of the environment 200 of the compute device 100 as shown in FIG. 2. For example, the method 500 may be executed by the cryptography driver 204, which may be embodied as software, firmware, and/or microcode executed by the processor 120. The method 500 begins in block 502, in which the compute device 100 determines whether the ECC engine 122 is busy. The compute device 100 may, for example, read the ECC busy signal 430 of the ECC engine 122 and determine whether the ECC busy signal 430 is set. If the ECC engine 122 is busy, the method 500 loops back to block 502 to continue waiting for the ECC engine 122. If the ECC engine 122 is not busy, the method 500 advances to block 504.

In block 504, the compute device 100 sets the 256-bit/384-bit datapath selector signal 440 of the ECC engine 122 according to the desired bit width for the ECC cryptographic operation. For example, the processor 120 may set the datapath selector signal 440 to program the ECC engine 122 to perform 384-bit cryptographic operations on 384-bit data or clear the datapath selector signal 440 to program the ECC engine 122 to perform 256-bit cryptographic operations on 256-bit data. Of course, in some embodiments the sense of the datapath selector signal 440 may be reversed. The bit width of various parameters and results data thus depends on the value of the datapath selector signal 440.

In block 506, the compute device 100 asserts the start signal 442 of the ECC engine 122. For example, the processor 120 may assert a pulse on the start signal 442. As described further below in connection with FIG. 6, the ECC engine 122 beings processing an ECC operation in response to a pulse being asserted on the start signal 442.

In block 508, the compute device 100 writes a parameter value to the data in port 422 of the ECC engine 122. The compute device 100 may write either a 384-bit value to the data in port 422 or a 256-bit value to the least-significant 256 bits of the data in port 422, depending on the value of the datapath selector signal 440. The compute device 100 also sets the data in valid signal 424 to indicate that valid data has been written to the data in port 422. The compute device 100 may write any one of the parameters required for the ECC operation that is to be performed by the ECC engine 122. In particular, the parameter value may correspond to any of the registers 402 to 420 shown in FIG. 4. For example, the parameter may correspond to the lower 256 or 348 bits of a hash e of a message to be signed or verified, an x- or y-coordinate of a base point G, an order n of the base point G, a prime number p defining the finite field of the elliptic curve, a constant a used in the definition of the elliptic curve, a private key d, an x- or y-coordinate of a public key Q, a random number k, a second random number λ, a first signature value r, or a second signature value s.

In block 510, the compute device 100 writes an opcode to the instruction port 446 of the ECC engine 122 that identifies the register 402 to 420 that is to store the data written to the data in port 422. Each of the opcodes may be embodied as a five-bit binary value that identifies a particular instruction to be performed by the ECC engine 122. The various opcodes may specify a register location to which data should be written or may specify an ECC-related operation to be performed. After writing the opcode to the instruction port 446, in block 512 the compute device 100 asserts the instruction valid signal 444 of the ECC engine 122. For example, the processor 120 may assert a pulse on the instruction valid signal 444. As described further below, in response to the instruction valid signal 444 being asserted, the ECC engine 122 may read the parameter data from the data in port 422 and store that data in a register identified by the opcode written to the instruction port 446.

In block 514, the compute device 100 determines whether additional parameters should be loaded into the ECC engine 122 for the ECC operation that is to be performed. If additional parameters remain, the method 500 loops back to block 508 to load the remaining parameters. If no additional parameters remain, the method 500 advances to block 516.

In block 516, the compute device 100 writes the opcode for the ECC operation that is to be performed to the instruction port 446 of the ECC engine 122. In particular, the compute device 100 may write an opcode for an ECC-related operation such as the opcode for elliptic curve scalar multiplication, the opcode for elliptic curve point addition, the opcode for elliptic curve point doubling. the opcode for prime field exponentiation, the opcode for prime field multiplication, the opcode for prime field addition, the opcode for prime field subtraction, the opcode for an ECDSA signing, or the opcode for an ECDSA verifying. In block 518, the compute device 100 asserts the instruction valid signal 444 of the ECC engine 122. For example, the processor 120 may assert a pulse on the instruction valid signal 444. As described further below, in response to the instruction valid signal 444 being asserted, the ECC engine 122 performs the ECC operation specified by the opcode written to the instruction port 446. The ECC engine 122 may perform a 384-bit operation or a 256-bit operation based on the datapath selector signal 440.

In block 520, the compute device 100 determines whether the ECC engine 122 is done processing the ECC operation.

For example, the processor 120 may wait for a pulse to be asserted by the ECC engine 122 on the ECC done signal 432. If the ECC engine 122 is not done processing the ECC operation, the method 500 loops back to block 520 to continue waiting for the ECC engine 122. If the ECC operation is done, the method 500 advances to block 522.

In block 522, the compute device 100 reads results data from one or more of the data out ports 426, 428 of the ECC engine 122. The compute device 100 may only read the results data if the data out valid signal 434 of the ECC engine 122 is set. The particular data read by the compute device 100 may depend on the ECC operation performed. For example, for elliptic curve operations, the compute device 100 may read the x coordinate of a result point from the data out port 426 and the y coordinate of the result point from the data out port 428. As another example, for a prime field operation, the compute device 100 may read a result value from the data out port 426. The compute device 100 may read 384-bit result data or 256-bit result data depending on the value of the datapath selector signal 440. In some cases, such as after an ECDSA verify operation, the compute device 100 may determine the output of the operation based on several bits of a data out port 428, even if the bits of the output register are all expected to be the same. For example, for a successful verification of a signature, the output of a data out port 428 may be all ones, while the output of the data out port 428 may be all zeros for a failed verification of a signature. The compute device 100 may evaluate the value of two or more bits of the data out port 428 in order to determine whether the verification was successful. Such an approach may protect against certain attacks such as one which flips the value of one bit. After reading the result data, the method 500 loops back to block 502 to perform another ECC operation.

Figure 6:
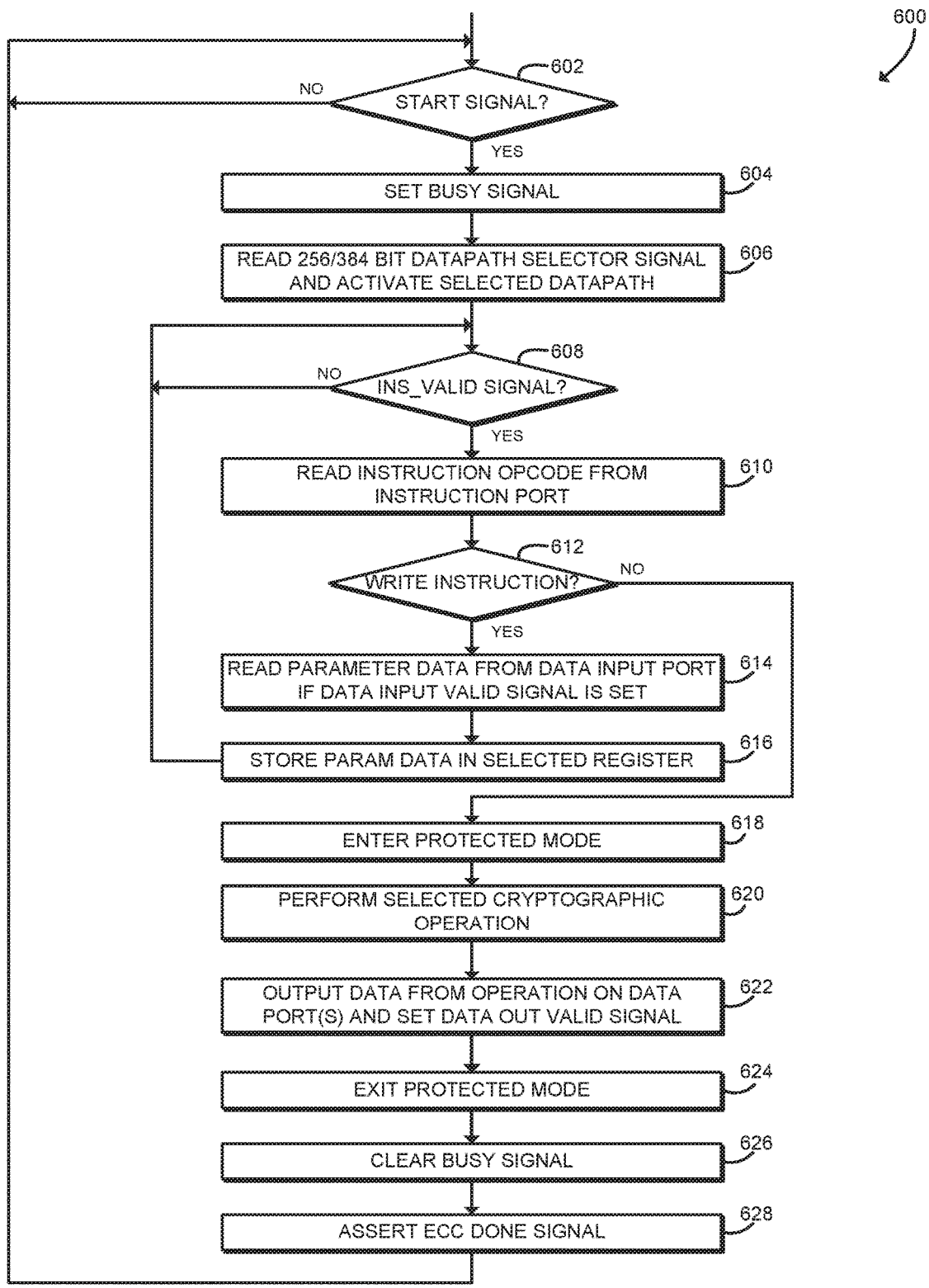
FIG. 6 is a simplified flow diagram of at least one embodiment of a method for robust computation of elliptic curve digital signatures that may be executed by the compute device of FIGS. 1-4.

Referring now to FIG. 6, in use, the compute device 100 may execute a method 600 for robust computation of an ECC operation. It should be appreciated that, in some embodiments, the operations of the method 600 may be performed by one or more components of the environment 200 of the compute device 100 as shown in FIG. 2, such as the ECC engine 122. The method 600 begins in block 602, in which the ECC engine 122 monitors for a pulse asserted on the start signal 442 of the ECC engine 122. As described above, software and/or firmware executed by the processor 120 may assert a pulse on the start signal 442 to start processing an ECC operation. If no pulse is detected, the method 600 loops back to block 602 to continue monitoring the start signal 442. If a pulse is detected, the method 600 advances to block 604.

In block 604, the ECC engine 122 sets the busy signal 430. The busy signal 430 indicates that the ECC engine 122 is currently processing an ECC operation. As described above, software and/or firmware executed by the compute device 100 may wait until the busy signal 430 is cleared before starting another ECC operation.

In block 606, the ECC engine 122 reads the 256-bit/384-bit datapath selector signal 440 and actives the selected datapath. As described above, the processor 120 may set the datapath selector signal 440 to program the ECC engine 122 to perform 384-bit cryptographic operations on 384-bit data or clear the datapath selector signal 440 to program the ECC engine 122 to perform 256-bit cryptographic operations on 256-bit data.

In block 608, the ECC engine 122 monitors for a pulse asserted on the instruction valid signal 444. As described above, software and/or firmware executed by the processor 120 may assert a pulse on the instruction valid signal 444 after an instruction to write data into a register or to perform an ECC operation has been written to the instruction port 446. If no pulse is detected, the method 600 loops back to block 608 to continue monitoring the instruction valid signal 444. If a pulse is detected, the method 600 advances to block 610.

In block 610, the ECC engine 122 reads an instruction opcode from the instruction port 446. As described above, the opcode is illustratively embodied as a five-bit value that identifies an instruction to be performed by the ECC engine 122. In block 612, the ECC engine 122 determines whether the opcode identifies a write instruction corresponding to a register 318. If the opcode does not identify a write instruction, the method 600 branches ahead to block 618, described below. If the opcode identifies a write instruction, the method 600 advances to block 614.

In block 614, the ECC engine 122 reads parameter data from the data in port 422. The ECC engine 122 may only read the parameter data if the data in valid signal 424 is set. Additionally or alternatively, in some embodiments the ECC engine 122 may read the parameter data in response to a pulse asserted on the data in valid signal 424. The ECC engine 122 may read 384 bits of data or 256 bits of data from the data in port 422, depending on the value of the datapath selector signal 440. In block 616, the ECC engine 122 stores the data read from the data in port 422 into the register 318 specified by the write instruction. After storing the data, the method 600 loops back to block 608 to continue monitoring the instruction valid signal 444. As described above in connection with FIG. 5, the software and/or firmware executed by the processor 120 may perform additional write instructions to write parameter data into each of the registers 318 used by the particular ECC operation to be performed.

Referring back to block 612, if the instruction opcode does not identify a write instruction, the method 600 branches ahead to block 618, in which the ECC engine 122 may, depending on the particular instruction, enter a protected mode. In the illustrative embodiment, the ECC engine 122 may enter a protected mode when the instruction is an ECDSA sign instruction. In the protected mode, the ECC engine 122 will ignore some or all of the inputs provided to the ECC engine 122, such as data in, data in valid, reset, ECC start, instruction valid, ECC instruction, etc, until the operation is complete. In block 620, the ECC engine 122 performs the selected cryptographic operation.

In block 622, the ECC engine 122 outputs data on to one or more of the data out ports 426, 428 and sets the data out valid signal 434. For example, the ECC engine 122 may copy data from one or more of the registers 318 to the data out ports 426, 428. The particular data output depends on the instruction that was performed by the ECC engine 122. For example, for elliptic curve point instructions the ECC engine 122 may output the x coordinate of a result point to the data out port 426 and the y coordinate of the result point to the data out port 428. For prime field instructions the ECC engine 122 may output a value to the data out port 426. For an ECDSA sign instruction, the ECC engine 122 may output a first signature value r to the data out port 426 and a second signature value s to the data out port 428. For an ECDSA verify instruction, the ECC engine 122 may provide all ones to one of the data out ports 426, 428 if the verify is successful and all zeros to the one of the data out ports 426, 428 if the verify is not successful. Providing several redundant bits for the output of the verify operation may protect against certain attacks such as one which flips the value of one bit. The ECC engine 122 may output 384-bit data or 256-bit data depending on the datapath selector signal 440. In block 622, the ECC engine 122 exits the protected mode.

In block 626, the ECC engine 122 clears the busy signal 430. Clearing the busy signal indicates that the ECC engine 122 is ready to process another ECC operation. In block 628, the ECC engine 122 asserts a pulse on the ECC done signal 432. As described above, after the ECC done signal 432 is asserted, software and/or firmware executed by the processor 120 may read the results from the data out ports 426, 428. After asserting the ECC done signal 432, the method 600 loops back to block 602 to monitor for additional ECC operations.

Figure 7:
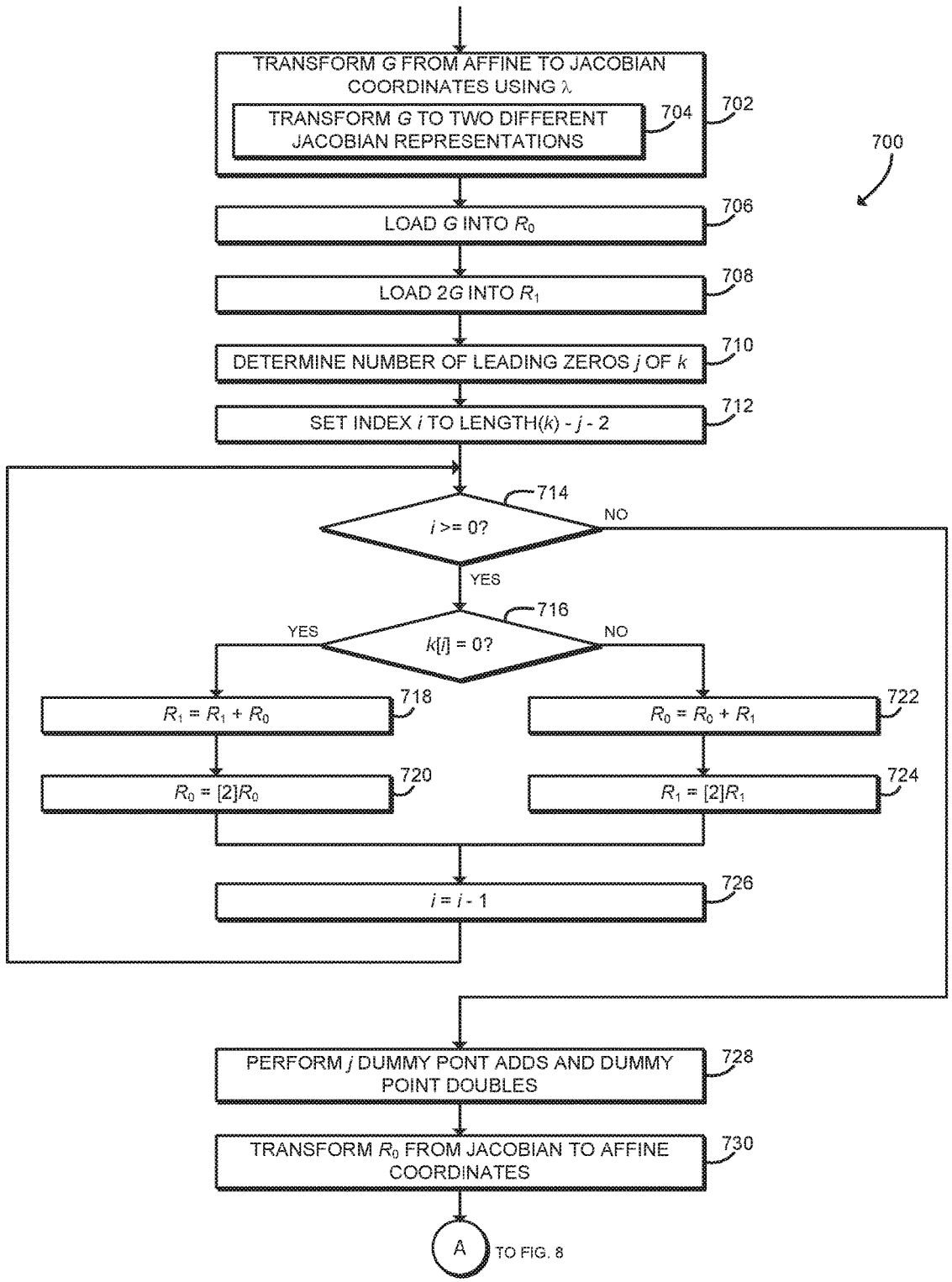
FIGS. 7 & 8 is a simplified flow diagram of at least one embodiment of a method for performing an ECC operation that may be executed by the compute device of FIGS. 1-4]

Referring now to FIG. 7, in use, the compute device 100 may execute a method 700 for performing an ECDSA signature. It should be appreciated that, in some embodiments, the operations of the method 700 may be performed by one or more components of the environment 200 of the compute device 100 as shown in FIG. 2, such as the ECC engine 122. In particular, the method 700 may be performed in connection with the block 620 of FIG. 6, described above. It should be appreciated that, prior to execution of the method 700, the compute device 100 may load appropriate values into one or more registers 318 of the ECC engine 122. In the illustrative embodiment, the compute device 100 loads (i) e, the lower 256 or 348 bits of a hash of the message to be signed, into register e 402, (ii) $G_x$, the x-coordinate of the base point G, into register $G_x$ 404, (iii) $G_y$, the y-coordinate of the base point G, into register $G_y$ 406, (iv) n, the order of G into register, into n 408, (v) p, the prime defining the finite field, into register p 410, (vi) a, a constant used in the definition of the elliptic curve, into register a 412, (vii) d, the private key, into register $d/Q_x$ 414, (viii) k, a first random number used in the signing algorithm, into register $k/Q_y$ 416, and (ix) $\lambda$, a second random number used in the signing algorithm, into register $\lambda/r$ 418. It should be appreciated that some of the values referenced in the method 700 such as $R_0$, $R_1$, j, i, and t, may be stored in one or more of the registers 402-420, which may require that a value in one of the registers 402-420 that is no longer needed be overwritten. Additionally or alternatively, some or all of the values referenced in the method 700 may be stored in registers 318 or other storage of the ECC engine 122 different from the registers 402-420. It should also be appreciated that some steps of the method 700 may be performed with use of components of the ECC engine 122, such as the point multiplication unit 306, the point addition/doubling unit 308, the p-exponentiation unit 310, and/or the p-MAS unit 312.

The method 700 begins in block 702, in which the ECC engine 122 transforms the base point G from affine to Jacobian coordinates using the random number $\lambda$. Affine coordinates may describe the point G using x and y values that correspond to a point on the elliptic curve equation. Transforming the affine coordinates to Jacobian coordinates projects those points into a different, but equivalent, coordinate system, which may allow for more efficient calculation of certain point operations. In particular, an affine point (x, y) can be transformed to an equivalent Jacobian point $(xz^2, yz^3, z)$ for any point z in the field. The ECC engine 122 may transform the base point G into any suitable Jacobian point, such as $(G_x\lambda^2, G_y\lambda^3, \lambda)$ or $(G_x\lambda^4, G_y\lambda^6, \lambda^2)$. In the illustrative embodiment, the ECC engine 122 transforms the base point G into two different Jacobian representations in block 704, such as both $(G_x\lambda^2, G_y\lambda^3, \lambda)$ and $(G_x\lambda^4, G_y\lambda^6, \lambda^2)$ transforming the coordinates of the base point G with use of the random number $\lambda$, the coordinates of the base point G are effectively transformed to a random number, which may protect against certain side-channel attacks such as monitoring the electromagnetic radiation of the ECC engine 122. Of course, it should be appreciated that, in some embodiments, the ECC engine 122 may perform the calculations of the method 700 in affine coordinates or with use of a transformation different from a transformation into Jacobian coordinates.

In block 706, the ECC engine 122 loads one representation of G into $R_0$, such as the Jacobian representation $(G_x\lambda^4, G_y\lambda^6, \lambda^2)$. In block 708, the ECC engine 122 loads one representation of [2] G into $R_1$, such as the Jacobian representation [2] $(G_x\lambda^2, G_y\lambda^3, \lambda)$. It should be appreciated that each of $R_1$ and $R_0$ may be embodied as more than one register, such as two registers for affine coordinates or three registers for Jacobian coordinates.

In blocks 710 to 726, the ECC engine 122 calculates [k]G with use of a Montgomery ladder approach, which allows computation of the calculation in a fixed amount of time. It should be appreciated that certain other operations of the method 700, such as determining the number of leading zeros in k, may also be performed in a fixed amount of time so that the overall execution time of the method 700 is fixed. In block 710, the ECC engine 122 determines the number of leading zeros in k and stores the number in a variable j. In block 712, the ECC engine 122 initializes an index i as the length of k in bits (e.g., 256 or 384) minus j minus 2.

In block 714, if the index i is zero or more, the method 700 proceeds to block 716. In block 716, if the ith bit of k is zero, the method 700 proceeds to block 718, in which the ECC engine 122 sets $R_1$ to be the point sum of $R_1$ and $R_0$. In block 720, the ECC engine 122 sets $R_0$ to be the point double of $R_0$.

Referring back to block 716, if the ith bit of k is not zero, the method 700 proceeds to block 722, in which the ECC engine 122 sets $R_0$ to be the point sum of $R_0$ and $R_1$. In block 720, the ECC engine 122 sets $R_1$ to be the point double of $R_1$.

In block 726, the ECC engine 122 decrements the index i and loops back to block 714. Referring back to block 714, if the index i is not zero or more, the method 700 jumps down to block 728. It should be appreciated that, after the bit-wise iteration over k that occurs in blocks 714 to 726, the result [k]G is stored in $R_0$.

In block 728, the ECC engine 122 performs j dummy point adds and dummy point doubles. Note that since the loop from block 714 to block 726 is not performed for the leading zeros of k, the skipped computation time is made up for by performing dummy operations, which may help ensure a fixed execution time for the method 700. In block 730, the ECC engine 122 transforms $R_0$ from Jacobian coordinates to affine coordinates. Since only the x-coordinate of the affine coordinates of $R_0$ is used (see block 732), the ECC engine 122 may only determine the x-coordinate of the affine coordinates of $R_0$.

Figure 8:
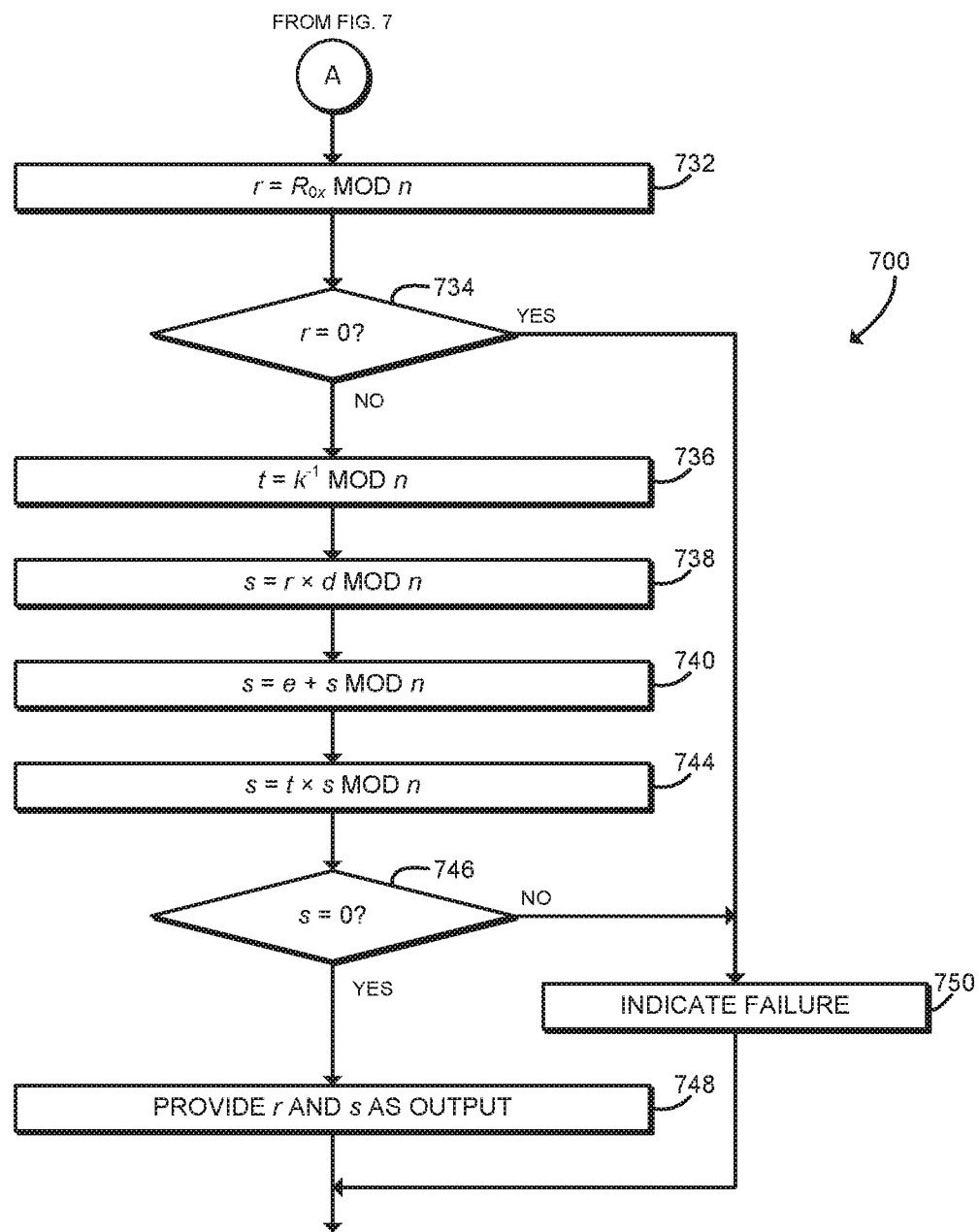

In block 732, in FIG. 8, the ECC engine 122 sets variable r to the x-coordinate of $R_0$ modulo n. In block 734, if r is equal to zero, the signature of the message with the random value selected for k is invalid, so the method 700 jumps to block 750, in which a failure is indicated by the ECC engine 122. If r is not equal to zero, the method 700 proceeds to block 736.

In block 736, the ECC engine 122 sets variable t to $k^{-1}$ modulo n. In block 738, the ECC engine 122 sets variable s to r times d module n. In block 740, the ECC engine 122 sets s equal to e plus s modulo n. In block 744, the ECC engine 122 sets s equal to t times s modulo n.

In block 746, if s is equal to zero, the signature of the message with the random value selected for k is invalid, so the method 700 jumps to block 750, in which a failure is indicated by the ECC engine 122. If s is not equal to zero, the method 700 proceeds to block 748. In block 748, the ECC engine 122 provides r and s as the signature values as output from the ECC engine 122, such as by storing r and s in data out ports 426 and 428.

Referring back to block 734 and 746, if either r or s is zero, the method 700 proceeds to block 750. In block 750, the ECC engine 122 indicates a failure in signing the message due to the particular value k selected for the signature. The ECC engine 122 may indicate a failure in any suitable way, such as by providing all zeros in one or both of data out ports 426 and 428.

Figure 9:
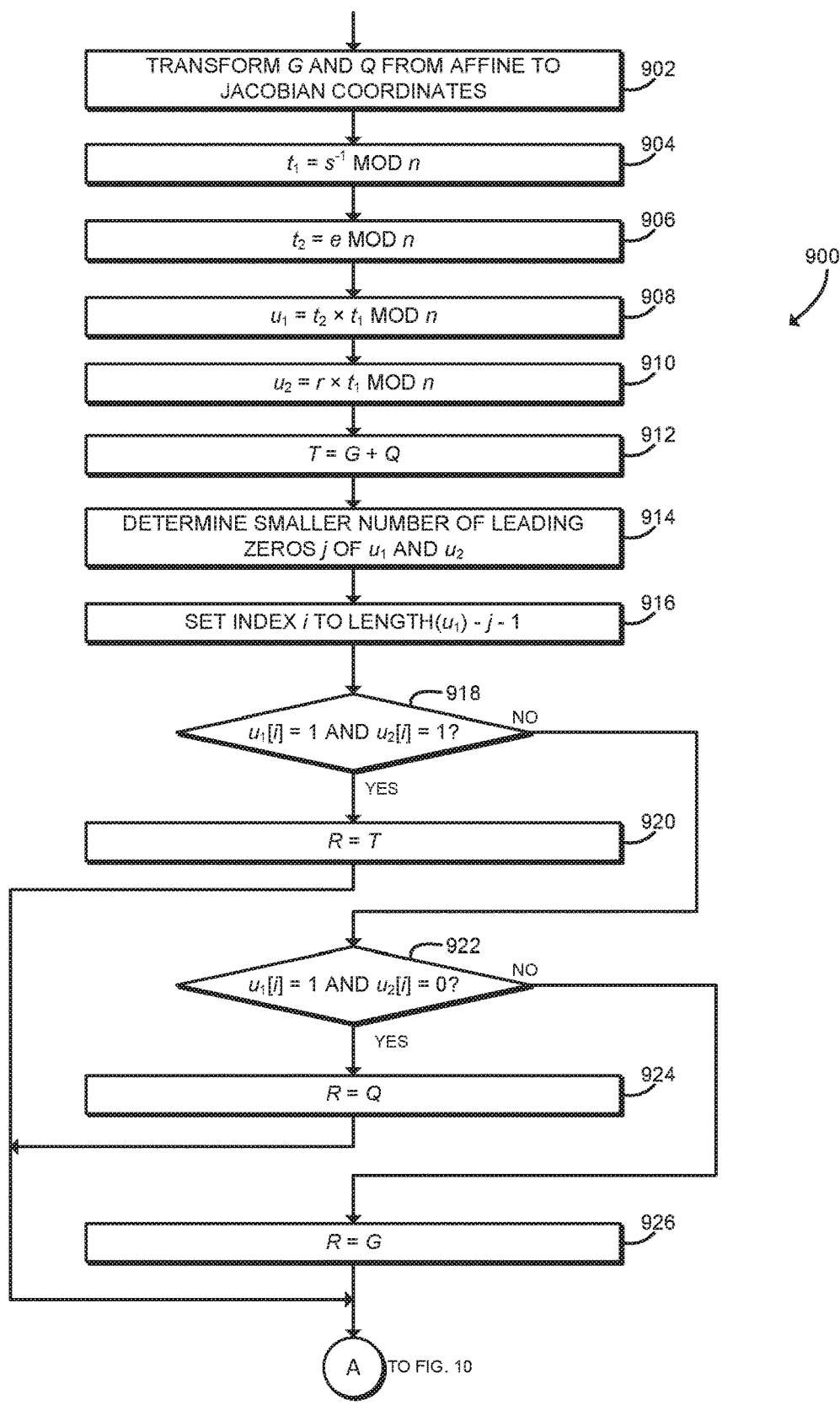
FIGS. 9 & 10 is a simplified flow diagram of at least one embodiment of a method for performing an ECDSA signature verification that may be executed by the compute device of FIGS. 1-4.
Figure 10:
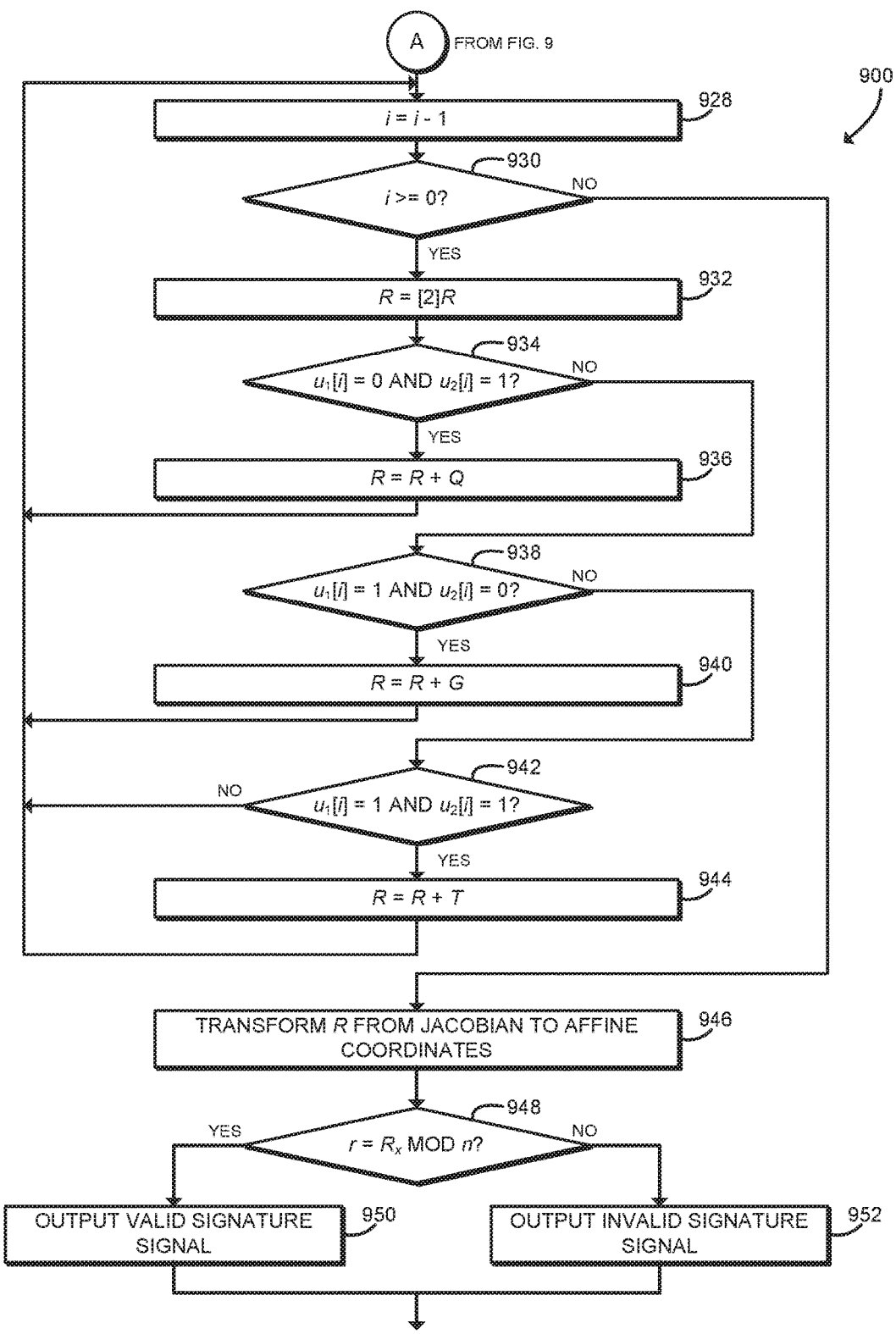

Referring now to FIG. 9, in use, the compute device 100 may execute a method 700 for performing an ECDSA signature verification. It should be appreciated that, in some embodiments, the operations of the method 700 may be performed by one or more components of the environment 200 of the compute device 100 as shown in FIG. 2, such as the ECC engine 122. In particular, the method 700 may be performed in connection with the block 620 of FIG. 6, described above. It should be appreciated that, prior to execution of the method 700, the compute device 100 may load appropriate values into one or more registers 318 of the ECC engine 122. In the illustrative embodiment, the compute device 100 loads (i) e, the lower 256 or 348 bits of a hash of the message to be signed, into register e 402, (ii) $G_x$, the x-coordinate of the base point G, into register $G_x$ 404, (iii) $G_y$, the y-coordinate of the base point G, into register $G_y$ 406, (iv) n, the order of G into register, into n 408, (v) p, the prime defining the finite field, into register p 410, (vi) a, a constant used in the definition of the elliptic curve, into register a 412, (vii) $Q_x$, the x-coordinate of the public key Q, into register d/$Q_x$ 414, (viii) $Q_y$, the y-coordinate of the public key Q, into register k/$Q_y$ 416, (ix) r, a first signature value, into register λ/r 418, and (x) s, a second signature value, into register s 420. It should be appreciated that some of the values referenced in the method 700 such as $t_1$, $t_2$, $u_1$, $u_2$, T, j, and i, may be stored in one or more of the registers 402-420, which may require that a value in one of the registers 402-420 that is no longer needed be overwritten. Additionally or alternatively, some or all of the values referenced in the method 700 may be stored in registers 318 or other storage of the ECC engine 122 different from the registers 402-420. It should also be appreciated that some steps of the method 700 may be performed with use of components of the ECC engine 122, such as the point multiplication unit 306, the point addition/doubling unit 308, the p-exponentiation unit 310, and/or the p-MAS unit 312.

As part of performing the ECDSA signature algorithm in the method 900, the ECC engine 122 calculates the point addition of two point multiplication operations of the form $[u_1]G+[u_2]Q$. The ECC engine 122 may perform such a calculation by doing a bit-wise iteration over both $u_1$ and $u_2$ at the same time, and adding G, Q, or the sum of G and Q to the intermediate result stored in R, depending on the particular bit values at the current index of $u_1$ and $u_2$. Since the sum of G and Q is calculated ahead of time, the sum of G and Q can be added to the intermediate result stored in R with a single point addition operation. It should be appreciated that, with such an approach, when the bit value of the current index is one for both $u_1$ and $u_2$, only one point addition is necessary. In contrast, if the calculation is done by first calculating $[u_1]G$ and $[u_2]Q$ separately, two point additions may be necessary when the bit value of a given index is one for both $u_1$ and $u_2$. Such an approach may significantly speed up the calculation, such as a reduction in execution time by a factor of approximately 1.5.

The method 900 begins in block 902, in which the ECC engine 122 transforms the base point G and the public key Q from affine to Jacobian coordinates. As stated above, affine coordinates may describe a point using x and y values that correspond to a point on the elliptic curve equation. Transforming the affine coordinates to Jacobian coordinates projects those points into a different, but equivalent, coordinate system, which may allow for more efficient calculation of certain point operations. In particular, an affine point (x, y) can be transformed to an equivalent Jacobian point ($xz^2$, $yz^3$, z) for any point z in the field. The ECC engine 122 may transform the points G and Q into any suitable Jacobian points, such as ($G_x$, $G_y$, 1) and ($Q_x$, $Q_y$, 1), respectively. Of course, it should be appreciated that, in some embodiments, the ECC engine 122 may perform the calculations of the method 900 in affine coordinates or with use of a transformation different from a transformation into Jacobian coordinates. It should be appreciated that points such as G, Q, T, and R may be embodied as more than one register, such as two registers for affine coordinates or three registers for Jacobian coordinates.

In block 904, the ECC engine 122 sets variable $t_i$ to $s^{-1}$ modulo n. In block 906, the ECC engine 122 sets variable $t_2$ to e modulo n. In block 908, the ECC engine 122 sets variable $u_1$ to $t_2$ times $t_1$ modulo n. In block 910, the ECC engine 122 sets variable $u_2$ to r times $t_1$ modulo n. In block 912, the ECC engine 122 sets variable T to the point sum of G and Q.

In block 914, the ECC engine 122 determines the smaller number of leading zeros in $u_1$ and $u_2$ and stores the number in a variable j. For example, if $u_1$ has 3 leading zeros and $u_2$ has 2 leading zeros, the ECC engine 122 will store 2 in j. In block 916, the ECC engine 122 sets index i to the length of $u_1$ minus j minus 1.

In block 918, if the ith bit of both $u_1$ and $u_2$ is 1, the method 900 proceeds to block 920, in which the value of T is stored in the variable R. From block 920, the method proceeds to block 928 in FIG. 10, in which the ECC engine 122 decrements the index i by one. Referring back to block 918, if it is not the case that the ith bit of both $u_1$ and $u_2$ is 1, the method 900 proceeds to block 922.

In block 922, if the ith bit of $u_1$ is 1 and the ith bit of $u_2$ is 0, the method 900 proceeds to block 924, in which the value of Q is stored in the variable R. From block 924, the method proceeds to block 928 in FIG. 10, in which the ECC engine 122 decrements the index i by one. Referring back to block 922, if it is not the case that the ith bit of $u_1$ is one and the ith bit of $u_2$ is 0, the method 900 proceeds to block 926. In block 926, the value of G is stored in the variable R.

In block 928, the ECC engine 122 decrements the index i by one. In block 930, if the index i is not more than or equal to zero, the method 900 proceeds to block 946, in which the ECC engine 122 transforms R from Jacobian coordinates to affine coordinates. If the index i is more than or equal to zero, the method 900 proceeds to block 932. In block 932, the ECC engine 122 stores the point doubling of R back into R.

In block 934, if the ith bit of $u_1$ is 0 and the ith bit of $u_2$ is 1, the method 900 proceeds to block 936, in which the ECC engine 122 stores the sum of R and Q back into R and then loops back to block 928. Referring back to block 934, if it is not the case that the ith bit of $u_1$ is 0 and the ith bit of $u_2$ is 1, the method 900 proceeds to block 938.

In block 938, if the ith bit of $u_1$ is 1 and the ith bit of $u_2$ is 0, the method 900 proceeds to block 940, in which the ECC engine 122 stores the sum of R and G back into R and then loops back to block 928 to decrement the index i. Referring back to block 938, if it is not the case that the ith bit of $u_1$ is 1 and the ith bit of $u_2$ is 0, the method 900 proceeds to block 942.

In block 942, if the ith bit of $u_1$ is 1 and the ith bit of $u_2$ is 1, the method 900 proceeds to block 944, in which the ECC engine 122 stores the sum of R and T back into R and then loops back to block 928 to decrement the index i. Referring back to block 942, if it is not the case that the ith bit of $u_1$ is 1 and the ith bit of $u_2$ is 0, the method 900 loops back to block 928.

Referring back to block 930, if the index i is not more than or equal to zero, the method 900 jumps to block 946. In block 946, the ECC engine 122 transforms R from Jacobian coordinates to affine coordinates. Since only the x-coordinate of the affine coordinates of R is used (see block 948), the ECC engine 122 may only determine the x-coordinate of the affine coordinates of R.

In block 948, the signature value r is compared to the x-coordinate of R modulo n. If r is equal to $R_x$ modulo n, the method proceeds to block 950, in which the ECC engine 122 outputs a signal that the signature is valid, such as by writing all ones to one or both of the data out ports 426, 428. Referring back to block 948, if r is not equal to $R_x$ modulo n, the method 900 proceeds to block 952, in which the ECC engine 122 outputs a signal that the signature is invalid, such as by writing all zeros to one or both of the data out ports 426, 428. It should be appreciated that changing the value of several bits based on whether the verification of the signature was successful may protect against certain attacks, such as fault injection attacks which may change the value of a single bit.

It should be appreciated that, in some embodiments, the methods 500, 600, 700, and/or 900, may be embodied as various instructions stored on a computer-readable media, which may be executed by the processor 120, the ECC engine 122, the I/O subsystem 124, and/or other components of a compute device 100 to cause the compute device 100 to perform the respective method 500, 600, 700, and/or 900. The computer-readable media may be embodied as any type of media capable of being read by the compute device 100 including, but not limited to, the memory 126, the data storage device 128, firmware devices, and/or other media.

Examples

Illustrative examples of the devices, systems, and methods disclosed herein are provided below. An embodiment of the devices, systems, and methods may include any one or more, and any combination of, the examples described below.

Example 1 includes a compute device for computation of elliptic curve digital signatures, the compute device comprising an elliptic curve cryptography (ECC) engine, wherein the ECC engine is to read a parameter value for each of a plurality of parameters of a elliptic curve digital signature algorithm sign operation from a data port of the ECC engine; read an opcode from an instruction port of the ECC engine, wherein the opcode is indicative of the elliptic curve digital signature algorithm sign operation; enter a protected mode in response to reading the opcode, wherein the ECC engine is configured to ignore input from the data port while in the protected mode; perform the elliptic curve digital signature algorithm sign operation in response to reading the opcode; exit the protected mode in response to completion of the elliptic curve digital signature algorithm sign operation; and write result data to an output port of the ECC engine in response to performing the elliptic curve digital signature algorithm sign operation.

Example 2 includes the subject matter of Example 1, and wherein the ECC engine is further to read a second opcode from the instruction port, wherein the second opcode is indicative of a cryptographic operation different from the elliptic curve digital signature algorithm sign operation; perform the cryptographic operation without entering the protected mode in response to reading the second opcode; and write second result data to the output port of the ECC engine in response to performing the cryptographic operation.

Example 3 includes the subject matter of any of Examples 1 and 2, and wherein to perform the cryptographic operation comprises to perform a prime field arithmetic operation.

Example 4 includes the subject matter of any of Examples 1-3, and wherein to perform the prime field arithmetic operation comprises to perform a prime field exponentiation operation, a prime field multiplication operation, a prime field addition operation, or a prime field subtraction operation.

Example 5 includes the subject matter of any of Examples 1-4, and wherein to perform the cryptographic operation comprises to perform an elliptic curve point operation.

Example 6 includes the subject matter of any of Examples 1-5, and wherein to perform the elliptic curve operation comprises to perform an elliptic curve scalar multiplication operation, an elliptic curve point addition operation, or an elliptic curve subtraction operation.

Example 7 includes the subject matter of any of Examples 1-6, and wherein to perform the elliptic curve digital signature algorithm sign operation comprises to perform the elliptic curve digital signature algorithm sign operation in a fixed amount of time independent of the parameter values of the plurality of parameters.

Example 8 includes the subject matter of any of Examples 1-7, and wherein one parameter of the plurality of parameters is a random number, wherein to perform the elliptic curve digital signal algorithm sign operation comprises to transform a point on an elliptic curve into Jacobian coordinates with use of the random number.

Example 9 includes the subject matter of any of Examples 1-8, and wherein to perform the elliptic curve digital signal algorithm sign operation comprises to transform a point on an elliptic curve into two different Jacobian coordinates with use of the random number.

Example 10 includes the subject matter of any of Examples 1-9, and wherein one parameter of the plurality of parameters is a second random number, wherein the second random number has one or more leading zeros, wherein to perform the elliptic curve digital signature algorithm sign operation comprises to perform, for each bit of the second random number after the first bit after the one or more leading zeros, an elliptic curve point addition operation and an elliptic curve point doubling operation; and perform, for each leading zero of the one or more leading zeros, a dummy elliptic curve point addition operation and a dummy elliptic curve point doubling operation, wherein the dummy elliptic curve point operations and the dummy elliptic curve point doubling operations have no effect on the result data.

Example 11 includes the subject matter of any of Examples 1-10, and wherein the ECC engine is further to read a second opcode from the instruction port, wherein the second opcode is indicative of an elliptic curve digital signature algorithm verify operation; perform the elliptic curve digital signature algorithm verify operation without entering the protected mode in response to reading the second opcode, wherein to perform the elliptic curve digital signature algorithm verify operation comprises to determine a first intermediate value $u_1$; determine a second intermediate value $u_2$; determine a smaller number of leading zeros of $u_1$ and $u_2$; perform, for each index location of $u_1$ after the first bit after the smaller number of leading zeros, one or more elliptic curve operations, wherein to perform, for each index location of $u_1$ after the first bit after the smaller number of leading zeros, the one or more elliptic curve operations comprises to perform a point doubling operation when the bit value of the index location of $u_1$ is 0 and the bit value of the index location of $u_2$ is 0; perform a point doubling operation and a point addition operation when the bit value of the index location of $u_1$ is 1 and the bit value of the index location of $u_2$ is 0; perform a point doubling operation and a point addition operation when the bit value of the index location of $u_1$ is 0 and the bit value of the index location of $u_2$ is 1; and perform a point doubling operation and only one point addition operation when the bit value of the index location of $u_1$ is 1 and the bit value of the index location of $u_2$ is 1; and write second result data to the output port of the ECC engine in response to performance of the elliptic curve digital signature algorithm verify operation.

Example 12 includes the subject matter of any of Examples 1-11, and wherein to write the second result data comprises to write a plurality of redundant bit values to the output port.

Example 13 includes a method for computation of elliptic curve digital signatures, the method comprising reading, by an elliptic curve cryptography (ECC) engine of a compute device, a parameter value for each of a plurality of parameters of a elliptic curve digital signature algorithm sign operation from a data port of the ECC engine; reading, by the ECC engine, an opcode from an instruction port of the ECC engine, wherein the opcode is indicative of the elliptic curve digital signature algorithm sign operation; entering, by the ECC engine, a protected mode in response to reading the opcode, wherein the ECC engine is configured to ignore input from the data port while in the protected mode; performing, by the ECC engine, the elliptic curve digital signature algorithm sign operation in response to reading the opcode; exiting, by the ECC engine, the protected mode in response to completion of the elliptic curve digital signature algorithm sign operation; and writing, by the ECC engine, result data to an output port of the ECC engine in response to performing the elliptic curve digital signature algorithm sign operation.

Example 14 includes the subject matter of Example 13, and further including reading, by the ECC engine, a second opcode from the instruction port, wherein the second opcode is indicative of a cryptographic operation different from the elliptic curve digital signature algorithm sign operation; performing, by the ECC engine, the cryptographic operation without entering the protected mode in response to reading the second opcode; and writing, by the ECC engine, second result data to the output port of the ECC engine in response to performing the cryptographic operation.

Example 15 includes the subject matter of any of Examples 13 and 14, and wherein performing the cryptographic operation comprises performing a prime field arithmetic operation.

Example 16 includes the subject matter of any of Examples 13-15, and wherein performing the prime field arithmetic operation comprises performing a prime field exponentiation operation, a prime field multiplication operation, a prime field addition operation, or a prime field subtraction operation.

Example 17 includes the subject matter of any of Examples 13-16, and wherein performing the cryptographic operation comprises performing an elliptic curve point operation.

Example 18 includes the subject matter of any of Examples 13-17, and wherein performing the elliptic curve operation comprises performing an elliptic curve scalar multiplication operation, an elliptic curve point addition operation, or an elliptic curve subtraction operation.

Example 19 includes the subject matter of any of Examples 13-18, and wherein performing the elliptic curve digital signature algorithm sign operation comprises performing the elliptic curve digital signature algorithm sign operation in a fixed amount of time independent of the parameter values of the plurality of parameters.

Example 20 includes the subject matter of any of Examples 13-19, and wherein one parameter of the plurality of parameters is a random number, wherein performing the elliptic curve digital signal algorithm sign operation comprises transforming a point on an elliptic curve into Jacobian coordinates with use of the random number.

Example 21 includes the subject matter of any of Examples 13-20, and wherein performing the elliptic curve digital signal algorithm sign operation comprises transforming a point on an elliptic curve into two different Jacobian coordinates with use of the random number.

Example 22 includes the subject matter of any of Examples 13-21, and wherein one parameter of the plurality of parameters is a second random number, wherein the second random number has one or more leading zeros, wherein performing the elliptic curve digital signature algorithm sign operation comprises performing, for each bit of the second random number after the first bit after the one or more leading zeros, an elliptic curve point addition operation and an elliptic curve point doubling operation; and performing, for each leading zero of the one or more leading zeros, a dummy elliptic curve point addition operation and a dummy elliptic curve point doubling operation, wherein the dummy elliptic curve point operations and the dummy elliptic curve point doubling operations have no effect on the result data.

Example 23 includes the subject matter of any of Examples 13-22, and further including reading, by the ECC engine, a second opcode from the instruction port, wherein the second opcode is indicative of an elliptic curve digital signature algorithm verify operation; performing, by the ECC engine, the elliptic curve digital signature algorithm verify operation without entering the protected mode in response to reading the second opcode, wherein performing the elliptic curve digital signature algorithm verify operation comprises determining a first intermediate value $u_1$; determining a second intermediate value $u_2$; determining a smaller number of leading zeros of $u_1$ and $u_2$; performing, for each index location of $u_1$ after the first bit after the smaller number of leading zeros, one or more elliptic curve operations, wherein performing, for each index location of $u_1$ after the first bit after the smaller number of leading zeros, the one or more elliptic curve operations comprises performing a point doubling operation when the bit value of the index location of $u_1$ is 0 and the bit value of the index location of $u_2$ is 0; performing a point doubling operation and a point addition operation when the bit value of the index location of $u_1$ is 1 and the bit value of the index location of $u_2$ is 0; performing a point doubling operation and a point addition operation when the bit value of the index location of $u_1$ is 0 and the bit value of the index location of $u_2$ is 1; and performing a point doubling operation and only one point addition operation when the bit value of the index location of $u_1$ is 1 and the bit value of the index location of $u_2$ is 1; and writing, by the ECC engine, second result data to the output port of the ECC engine in response to performing the elliptic curve digital signature algorithm verify operation.

Example 24 includes the subject matter of any of Examples 13-23, and wherein writing the second result data comprises writing a plurality of redundant bit values to the output port.

Example 25 includes one or more computer-readable media comprising a plurality of instructions stored thereon that, when executed, causes a ECC device to perform the method of any of Examples 13-24.

Example 26 includes a compute device for computation of elliptic curve digital signatures, the compute device comprising an elliptic curve cryptography (ECC) engine, wherein the ECC engine comprises means for reading a parameter value for each of a plurality of parameters of a elliptic curve digital signature algorithm sign operation from a data port of the ECC engine; means for reading an opcode from an instruction port of the ECC engine, wherein the opcode is indicative of the elliptic curve digital signature algorithm sign operation; means for entering a protected mode in response to reading the opcode, wherein the ECC engine is configured to ignore input from the data port while in the protected mode; means for performing the elliptic curve digital signature algorithm sign operation in response to reading the opcode; means for exiting the protected mode in response to completion of the elliptic curve digital signature algorithm sign operation; and means for writing result data to an output port of the ECC engine in response to performing the elliptic curve digital signature algorithm sign operation.

Example 27 includes the subject matter of Example 26, and wherein the ECC engine further comprises means for reading a second opcode from the instruction port, wherein the second opcode is indicative of a cryptographic operation different from the elliptic curve digital signature algorithm sign operation; means for performing the cryptographic operation without entering the protected mode in response to reading the second opcode; and means for writing second result data to the output port of the ECC engine in response to performing the cryptographic operation.

Example 28 includes the subject matter of any of Examples 26 and 27, and wherein the means for performing the cryptographic operation comprises means for performing a prime field arithmetic operation.

Example 29 includes the subject matter of any of Examples 26-28, and wherein the means for performing the prime field arithmetic operation comprises means for performing a prime field exponentiation operation, a prime field multiplication operation, a prime field addition operation, or a prime field subtraction operation.

Example 30 includes the subject matter of any of Examples 26-29, and wherein the means for performing the cryptographic operation comprises means for performing an elliptic curve point operation.

Example 31 includes the subject matter of any of Examples 26-30, and wherein the means for performing the elliptic curve operation comprises means for performing an elliptic curve scalar multiplication operation, an elliptic curve point addition operation, or an elliptic curve subtraction operation.

Example 32 includes the subject matter of any of Examples 26-31, and wherein the means for performing the elliptic curve digital signature algorithm sign operation comprises means for performing the elliptic curve digital signature algorithm sign operation in a fixed amount of time independent of the parameter values of the plurality of parameters.

Example 33 includes the subject matter of any of Examples 26-32, and wherein one parameter of the plurality of parameters is a random number, wherein the means for performing the elliptic curve digital signal algorithm sign operation comprises means for transforming a point on an elliptic curve into Jacobian coordinates with use of the random number.

Example 34 includes the subject matter of any of Examples 26-33, and wherein the means for performing the elliptic curve digital signal algorithm sign operation comprises means for transforming a point on an elliptic curve into two different Jacobian coordinates with use of the random number.

Example 35 includes the subject matter of any of Examples 26-34, and wherein one parameter of the plurality of parameters is a second random number, wherein the second random number has one or more means for leading zeros, wherein the means for performing the elliptic curve digital signature algorithm sign operation comprises means for performing, for each bit of the second random number after the first bit after the one or more leading zeros, an elliptic curve point addition operation and an elliptic curve point doubling operation; and means for performing, for each leading zero of the one or more leading zeros, a dummy elliptic curve point addition operation and a dummy elliptic curve point doubling operation, wherein the dummy elliptic curve point operations and the dummy elliptic curve point doubling operations have no effect on the result data.

Example 36 includes the subject matter of any of Examples 26-35, and wherein the ECC engine further comprises means for reading a second opcode from the instruction port, wherein the second opcode is indicative of an elliptic curve digital signature algorithm verify operation; means for performing the elliptic curve digital signature algorithm verify operation without entering the protected mode in response to reading the second opcode, wherein the means for performing the elliptic curve digital signature algorithm verify operation comprises means for determining a first intermediate value $u_1$; means for determining a second intermediate value $u_2$; means for determining a smaller number of leading zeros of $u_1$ and $u_2$; means for performing, for each index location of $u_1$ after the first bit after the smaller number of leading zeros, one or more elliptic curve operations, wherein the means for performing, for each index location of $u_1$ after the first bit after the smaller number of leading zeros, the one or more elliptic curve operations comprises means for performing a point doubling operation when the bit value of the index location of $u_1$ is 0 and the bit value of the index location of $u_2$ is 0; means for performing a point doubling operation and a point addition operation when the bit value of the index location of $u_1$ is 1 and the bit value of the index location of $u_2$ is 0; means for performing a point doubling operation and a point addition operation when the bit value of the index location of $u_1$ is 0 and the bit value of the index location of $u_2$ is 1; and means for performing a point doubling operation and only one point addition operation when the bit value of the index location of $u_1$ is 1 and the bit value of the index location of $u_2$ is 1; and means for writing, by the ECC engine, second result data to the output port of the ECC engine in response to performing the elliptic curve digital signature algorithm verify operation.

Example 37 includes the subject matter of any of Examples 26-36, and wherein the means for writing the second result data comprises means for writing a plurality of redundant bit values to the output port.

The invention claimed is:

1. A compute device for computation of elliptic curve digital signatures, the compute device comprising:
   an elliptic curve cryptography (ECC) engine, wherein the ECC engine is to:
     read a parameter value for each of a plurality of parameters of a elliptic curve digital signature algorithm sign operation from a data port of the ECC engine;
     read an opcode from an instruction port of the ECC engine, wherein the opcode is indicative of the elliptic curve digital signature algorithm sign operation;
     enter a protected mode in response to reading the opcode, wherein the ECC engine is configured to ignore input from the data port while in the protected mode;
     perform the elliptic curve digital signature algorithm sign operation in response to reading the opcode;
     exit the protected mode in response to completion of the elliptic curve digital signature algorithm sign operation; and
     write result data to an output port of the ECC engine in response to performing the elliptic curve digital signature algorithm sign operation.

2. The compute device of claim 1, wherein the ECC engine is further to:
   read a second opcode from the instruction port, wherein the second opcode is indicative of a cryptographic operation different from the elliptic curve digital signature algorithm sign operation;
   perform the cryptographic operation without entering the protected mode in response to reading the second opcode; and
   write second result data to the output port of the ECC engine in response to performing the cryptographic operation.

3. The compute device of claim 2, wherein to perform the cryptographic operation comprises to perform a prime field arithmetic operation.

4. The compute device of claim 2, wherein to perform the cryptographic operation comprises to perform an elliptic curve point operation.

5. The compute device of claim 4, wherein to perform the elliptic curve operation comprises to perform an elliptic curve scalar multiplication operation, an elliptic curve point addition operation, or an elliptic curve subtraction operation.

6. The compute device of claim 1, wherein to perform the elliptic curve digital signature algorithm sign operation comprises to perform the elliptic curve digital signature algorithm sign operation in a fixed amount of time independent of the parameter values of the plurality of parameters.

7. The compute device of claim 6, wherein one parameter of the plurality of parameters is a random number, wherein to perform the elliptic curve digital signal algorithm sign operation comprises to transform a point on an elliptic curve into Jacobian coordinates with use of the random number.

8. The compute device of claim 1, wherein one parameter of the plurality of parameters is a scalar multiplier, wherein the scalar multiplier has one or more leading zeros, wherein to perform the elliptic curve digital signature algorithm sign operation comprises to:
   perform, for each bit of the scalar multiplier after the first bit after the one or more leading zeros, an elliptic curve point addition operation and an elliptic curve point doubling operation; and
   perform, for each leading zero of the one or more leading zeros, a dummy elliptic curve point addition operation and a dummy elliptic curve point doubling operation, wherein the dummy elliptic curve point operations and the dummy elliptic curve point doubling operations have no effect on the result data.

9. The compute device of claim 1, wherein the ECC engine is further to:
   read a second opcode from the instruction port, wherein the second opcode is indicative of an elliptic curve digital signature algorithm verify operation;
   perform the elliptic curve digital signature algorithm verify operation without entering the protected mode in response to reading the second opcode, wherein to perform the elliptic curve digital signature algorithm verify operation comprises to:
     determine a first intermediate value $u_1$;
     determine a second intermediate value $u_2$;
     determine a smaller number of leading zeros of $u_1$ and $u_2$;
     perform, for each index location of $u_1$ after the first bit after the smaller number of leading zeros, one or more elliptic curve operations, wherein to perform, for each index location of $u_1$ after the first bit after the smaller number of leading zeros, the one or more elliptic curve operations comprises to:
       perform a point doubling operation when the bit value of the index location of $u_1$ is 0 and the bit value of the index location of $u_2$ is 0;
       perform a point doubling operation and a point addition operation when the bit value of the index location of $u_1$ is 1 and the bit value of the index location of $u_2$ is 0;
       perform a point doubling operation and a point addition operation when the bit value of the index location of $u_1$ is 0 and the bit value of the index location of $u_2$ is 1; and
       perform a point doubling operation and only one point addition operation when the bit value of the index location of $u_1$ is 1 and the bit value of the index location of $u_2$ is 1; and
     write second result data to the output port of the ECC engine in response to performance of the elliptic curve digital signature algorithm verify operation.

10. The compute device of claim 9, wherein to write the second result data comprises to write a plurality of redundant bit values to the output port.

11. A method for computation of elliptic curve digital signatures, the method comprising:
   reading, by an elliptic curve cryptography (ECC) engine of a compute device, a parameter value for each of a plurality of parameters of a elliptic curve digital signature algorithm sign operation from a data port of the ECC engine;
   reading, by the ECC engine, an opcode from an instruction port of the ECC engine, wherein the opcode is indicative of the elliptic curve digital signature algorithm sign operation;
   entering, by the ECC engine, a protected mode in response to reading the opcode, wherein the ECC engine is configured to ignore input from the data port while in the protected mode;

performing, by the ECC engine, the elliptic curve digital signature algorithm sign operation in response to reading the opcode;

exiting, by the ECC engine, the protected mode in response to completion of the elliptic curve digital signature algorithm sign operation; and writing, by the ECC engine, result data to an output port of the ECC engine in response to performing the elliptic curve digital signature algorithm sign operation.

12. The method of claim 11, further comprising:

reading, by the ECC engine, a second opcode from the instruction port, wherein the second opcode is indicative of a cryptographic operation different from the elliptic curve digital signature algorithm sign operation;

performing, by the ECC engine, the cryptographic operation without entering the protected mode in response to reading the second opcode; and writing, by the ECC engine, second result data to the output port of the ECC engine in response to performing the cryptographic operation.

13. The method of claim 12, wherein performing the cryptographic operation comprises performing a prime field arithmetic operation.

14. The method of claim 12, wherein performing the cryptographic operation comprises performing an elliptic curve point operation.

15. The method of claim 14, wherein performing the elliptic curve operation comprises performing an elliptic curve scalar multiplication operation, an elliptic curve point addition operation, or an elliptic curve subtraction operation.

16. The method of claim 11, wherein the plurality of parameters of the elliptic curve digital signature algorithm sign operation include all input parameters of the elliptic curve digital signature algorithm sign operation, wherein performing the elliptic curve digital signature algorithm sign operation comprises performing the elliptic curve digital signature algorithm sign operation in a fixed amount of time independent of the parameter values of the plurality of parameters.

17. The method of claim 16, wherein one parameter of the plurality of parameters is a random number, wherein performing the elliptic curve digital signal algorithm sign operation comprises transforming a point on an elliptic curve into Jacobian coordinates with use of the random number.

18. The method of claim 17, wherein performing the elliptic curve digital signal algorithm sign operation comprises transforming a point on an elliptic curve into two different Jacobian coordinates with use of the random number.

19. The method of claim 11, wherein one parameter of the plurality of parameters is a scalar multiplier, wherein the scalar multiplier has one or more leading zeros, wherein performing the elliptic curve digital signature algorithm sign operation comprises:

performing, for each bit of the scalar multiplier after the first bit after the one or more leading zeros, an elliptic curve point addition operation and an elliptic curve point doubling operation; and performing, for each leading zero of the one or more leading zeros, a dummy elliptic curve point addition operation and a dummy elliptic curve point doubling operation, wherein the dummy elliptic curve point operations and the dummy elliptic curve point doubling operations have no effect on the result data.

20. The method of claim 11, further comprising:

reading, by the ECC engine, a second opcode from the instruction port, wherein the second opcode is indicative of an elliptic curve digital signature algorithm verify operation;

performing, by the ECC engine, the elliptic curve digital signature algorithm verify operation without entering the protected mode in response to reading the second opcode, wherein performing the elliptic curve digital signature algorithm verify operation comprises:

determining a first intermediate value $u_1$;

determining a second intermediate value $u_2$;

determining a smaller number of leading zeros of $u_1$ and $u_2$;

performing, for each index location of $u_1$ after the first bit after the smaller number of leading zeros, one or more elliptic curve operations, wherein performing, for each index location of $u_1$ after the first bit after the smaller number of leading zeros, the one or more elliptic curve operations comprises:

performing a point doubling operation when the bit value of the index location of $u_1$ is 0 and the bit value of the index location of $u_2$ is 0;

performing a point doubling operation and a point addition operation when the bit value of the index location of $u_1$ is 1 and the bit value of the index location of $u_2$ is 0;

performing a point doubling operation and a point addition operation when the bit value of the index location of $u_1$ is 0 and the bit value of the index location of $u_2$ is 1; and performing a point doubling operation and only one point addition operation when the bit value of the index location of $u_1$ is 1 and the bit value of the index location of $u_2$ is 1; and writing, by the ECC engine, second result data to the output port of the ECC engine in response to performing the elliptic curve digital signature algorithm verify operation.

21. The method of claim 20, wherein writing the second result data comprises writing a plurality of redundant bit values to the output port.

22. One or more non-transitory computer-readable media comprising a plurality of instructions stored thereon that, when executed, causes an elliptic curve cryptography (ECC) engine of a compute device to:

read a parameter value for each of a plurality of parameters of a elliptic curve digital signature algorithm sign operation from a data port of the ECC engine;

read an opcode from an instruction port of the ECC engine, wherein the opcode is indicative of the elliptic curve digital signature algorithm sign operation;

enter a protected mode in response to reading the opcode, wherein the ECC engine is configured to ignore input from the data port while in the protected mode;

perform the elliptic curve digital signature algorithm sign operation in response to reading the opcode;

exit the protected mode in response to completion of the elliptic curve digital signature algorithm sign operation; and write result data to an output port of the ECC engine in response to performing the elliptic curve digital signature algorithm sign operation.

23. The one or more non-transitory computer-readable media of claim 22, wherein the plurality of parameters of the elliptic curve digital signature algorithm sign operation include all input parameters of the elliptic curve digital signature algorithm sign operation, wherein to perform the elliptic curve digital signature algorithm sign operation comprises to perform the elliptic curve digital signature algorithm sign operation in a fixed amount of time independent of the parameter values of the plurality of parameters.

24. The one or more non-transitory computer-readable media of claim 22, wherein the plurality of instructions further cause the ECC engine to:

read a second opcode from the instruction port, wherein the second opcode is indicative of an elliptic curve digital signature algorithm verify operation;

perform the elliptic curve digital signature algorithm verify operation without entering the protected mode in response to reading the second opcode, wherein to perform the elliptic curve digital signature algorithm verify operation comprises to:

determine a first intermediate value $u_1$;
determine a second intermediate value $u_2$;
determine a smaller number of leading zeros of $u_1$ and $u_2$;
perform, for each index location of $u_1$ after the first bit after the smaller number of leading zeros, one or more elliptic curve operations, wherein to perform, for each index location of $u_1$ after the first bit after the smaller number of leading zeros, the one or more elliptic curve operations comprises to:

perform a point doubling operation when the bit value of the index location of $u_1$ is 0 and the bit value of the index location of $u_2$ is 0;

perform a point doubling operation and a point addition operation when the bit value of the index location of $u_1$ is 1 and the bit value of the index location of $u_2$ is 0;

perform a point doubling operation and a point addition operation when the bit value of the index location of $u_1$ is 0 and the bit value of the index location of $u_2$ is 1; and perform a point doubling operation and only one point addition operation when the bit value of the index location of $u_1$ is 1 and the bit value of the index location of $u_2$ is 1; and write second result data to the output port of the ECC engine in response to performance of the elliptic curve digital signature algorithm verify operation.

25. The compute device of claim 6, wherein the plurality of parameters include a base point G and a scalar multiplier, wherein the base point G defines a group of order n and the scalar multiplier has n bits, wherein to perform the elliptic curve digital signature algorithm sign operation in the fixed amount of time independent of the parameter values of the plurality of parameters comprises to perform no more than n point addition operations and n point doubling operations.

* * * * *